US00RE36769E

United States Patent [19]

Ozawa et al.

[11] E Patent Number: Re. 36,769

[45] Reissued Date of Patent: Jul. 11, 2000

[54] CARD TYPE INPUT/OUTPUT INTERFACE DEVICE AND ELECTRONIC DEVICE USING THE SAME

[75] Inventors: Masayuki Ozawa, Sagamihara; Shigeru Suzuki, Kawasaki, both of Japan

[73] Assignee: Fujitsu Limited, Kanagawa, Japan

[21] Appl. No.: 08/731,754

[22] Filed: Oct. 18, 1996

Related U.S. Patent Documents

Reissue of:

[64] Patent No.: 5,357,091
Issued: Oct. 18, 1994
Appl. No.: 07/875,800
Filed: Apr. 30, 1992

[30] Foreign Application Priority Data

Apr. 30, 1991 [JP] Japan ..... 3-124635

[51] Int. Cl.[7] ..... G06K 19/06

[52] U.S. Cl. ..... 235/380; 235/492; 235/486

[58] Field of Search ..... 235/492, 380, 235/382, 382.5, 379, 375, 383, 441, 486

[56] References Cited

U.S. PATENT DOCUMENTS

| | | |
|---|---|---|
| 1,484,648 | 2/1924 | Jenkins . |
| 3,936,833 | 2/1976 | Bush . |
| 4,250,563 | 2/1981 | Struger . |
| 4,286,262 | 8/1981 | Wahl . |
| 4,362,905 | 12/1982 | Ismail . |
| 4,399,487 | 8/1983 | Neumann . |
| 4,479,198 | 10/1984 | Romano et al. . |
| 4,480,835 | 11/1984 | Williams . |
| 4,516,777 | 5/1985 | Nikora . |
| 4,744,006 | 5/1988 | Duffield . |
| 4,796,215 | 1/1989 | Hatta . |
| 4,821,107 | 4/1989 | Naito et al. . |
| 4,821,146 | 4/1989 | Behrens et al. . |
| 4,850,899 | 7/1989 | Maynard . |
| 4,855,779 | 8/1989 | Ishikawa et al. . |
| 4,858,162 | 8/1989 | Kieffer et al. . |
| 4,865,561 | 9/1989 | Collier et al. . |
| 4,878,848 | 11/1989 | Ingalsbe . |
| 4,882,702 | 11/1989 | Struger et al. . |
| 4,894,792 | 1/1990 | Mitchell et al. . |
| 4,922,420 | 5/1990 | Nakagawa et al. . |

(List continued on next page.)

FOREIGN PATENT DOCUMENTS

| | | |
|---|---|---|
| 0 251 477 A2 | 1/1988 | European Pat. Off. . |
| 0 351 961 A2 | 1/1990 | European Pat. Off. . |
| 0 394 114 A1 | 10/1990 | European Pat. Off. . |
| 0 426 414 A2 | 5/1991 | European Pat. Off. . |
| 0 490 373 A1 | 6/1992 | European Pat. Off. . |
| 0 718 776 A2 | 6/1996 | European Pat. Off. . |
| 0 718 777 A3 | 6/1996 | European Pat. Off. . |
| 62-248054 | 10/1987 | Japan . |
| 63-72657 | 5/1988 | Japan . |
| 64-8492 | 1/1989 | Japan . |
| 2-8251 U | 1/1990 | Japan . |
| 2-126233 | 10/1990 | Japan . |
| 3-53776 U | 5/1991 | Japan . |
| 4-213715 | 8/1992 | Japan . |

OTHER PUBLICATIONS

"Memories in My Pocket", Byte magazine, Feb. 1991, p. 251; vol. 16, No. 2.

"Understanding How to Apply the Meta Format", Memory Card, p. 36–38, May/Jun. 1991.

*Primary Examiner*—Thien Le
*Attorney, Agent, or Firm*—Helfgott & Karas, PC.

[57] ABSTRACT

A card type input/output interface device includes a first connection part for transferring data between a main body of an electronic device and the card type input/output interface device, a second connection part which is coupled to the first connection part and transfers data between an external device and the card type input/output interface device, and a card supporting the first and second connection part. The first connection part is accommodated in the main body when the card type input/output interface device is inserted into a slot provided in the main body.

51 Claims, 11 Drawing Sheets

U.S. PATENT DOCUMENTS

| | | | |
|---|---|---|---|
| 4,924,216 | 5/1990 | Leung . | |
| 4,959,026 | 9/1990 | Kreinberg . | |
| 4,968,260 | 11/1990 | Ingalsbe . | |
| 4,978,949 | 12/1990 | Herron et al. . | |
| 4,980,856 | 12/1990 | Ueno . | |
| 4,985,921 | 1/1991 | Schwartz | 235/380 |
| 5,030,128 | 7/1991 | Herron et al. . | |
| 5,036,313 | 7/1991 | Lin et al. . | |
| 5,036,429 | 7/1991 | Kaneda et al. . | |
| 5,050,041 | 9/1991 | Shafi . | |
| 5,139,439 | 8/1992 | Shie . | |
| 5,142,446 | 8/1992 | Tanaka et al. . | |
| 5,149,945 | 9/1992 | Johnson et al. | 235/380 |
| 5,155,663 | 10/1992 | Harase . | |
| 5,157,247 | 10/1992 | Takahira | 235/380 |
| 5,175,818 | 12/1992 | Kunimoto et al. | 395/200 |
| 5,184,282 | 2/1993 | Kaneda et al. . | |
| 5,212,369 | 5/1993 | Karlisch et al. | 235/380 |
| 5,227,953 | 7/1993 | Lindberg et al. . | |
| 5,239,165 | 8/1993 | Novak | 235/380 |
| 5,241,160 | 8/1993 | Bashan et al. | 235/380 |
| 5,249,270 | 9/1993 | Stewart et al. | 395/200 |
| 5,274,765 | 12/1993 | Le Gallo . | |
| 5,347,110 | 9/1994 | Audebert et al. . | |
| 5,373,149 | 12/1994 | Rasmussen | 235/492 |
| 5,483,422 | 1/1996 | Bowen et al. | 235/486 |
| 5,500,517 | 3/1996 | Cagliostro | 235/486 |
| 5,563,400 | 10/1996 | Le Roux | 235/486 |
| 5,574,270 | 11/1996 | Steffen | 235/441 |
| 5,635,701 | 6/1997 | Glotton | 235/486 |

CARD TYPE INPUT/OUTPUT INTERFACE DEVICE AND ELECTRONIC DEVICE USING THE SAME

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention generally relates to a card type input/output interface device, which couples a main body of an electronic device system and an external or peripheral device with each other.

2. Description of the Prior Art

As is well known, advances in the semiconductor technology bring about down-sizing of various electronic device systems. An IC (Integrated Circuit) memory card was created under the above circumstances. An IC memory card, which functions as an external storage device, is inserted into a slot of the main body of an electronic device system. Normally, a small-scale electronic device system, such as a laptop computer, has a connector for connecting it to external devices such as a printing machine and a modem. There is currently a need for further down-sizing and for cost reducing of such electronic device systems.

An IC memory card comprises integrated volatile memories and/or integrated nonvolatile memories mounted on a card. Examples of the integrated volatile memories are an SRAM (Static Random Access Memory) or a DRAM (Dynamic Random Access MemOry), and examples of the integrated non-volatile memory are a mask ROM (Read Only Memory) and an EEPROM (Electrically Erasable Programmable Read Only Memory). If 12 IC memories, each having a storage capacity of 64 kbits, are mounted on a card, an IC memory card having a storage capacity of 768 kbits will be formed. Hence, it is easy to form an IC memory card having a storage capacity of a few megabits to tens of megabits by mounting, on the card, a plurality of IC memories, each memory having a storage capacity of few megabits on a chip. An IC card has been practically used in which a processor is formed integrally with IC memories. Such an IC card has the function of processing data. This IC card is also called a smart card or an intelligent card.

The external dimensions of IC memory cards or IC cards are 85.6×54.0×3.3 [mm], for example. These cards are inserted into slots of electronic device systems, such as word processors and personal computers. In the state where the cards are inserted into the slots, the cards make electric connections with internal buses or registers provided in the electronic device systems. These electric connections can be made by means of direct contact structures or non-contact structures.

Nowadays, small-scale electronic device systems use IC memory cards as replaceable external storage devices. Further, external or peripheral electronic device systems which are not always used together with the main body are electrically connected to the main body via a connector formed on, for example, a sidewall(s) of the main body. The use of the above connector mounted on the sidewall of the main body prevents down-sizing of electronic device systems.

SUMMARY OF THE INVENTION

It is a general object of the present invention to provide a card type input/output interface device in which the above disadvantages are eliminated.

A more specific object of the present invention is to facilitate down-sizing of the main body of an electronic device system by means of a card type input/output interface device, which is inserted into a slot formed in the main body.

The above objects of the present invention are achieved by a card type input/output interface device comprising: first connection means for transferring data between a main body of an electronic device and the card type input/output interface device; second connection means, coupled to the first connection means, for transferring data between an external device and the card type input/output interface device; and a card supporting the first and second connection means. The first connection means is accommodated in the main body when the card type input/output interface device is inserted into a slot provided in the main body.

Another object of the present invention is to provide an electronic device system using the above card type input/output interface device.

This object of the present invention is achieved by an electronic device system comprising: a main body of the electronic device system, the main body comprising a slot; a card type input/output interface device inserted into the slot; and an external device. The card type input/output interface device comprises: first connection means for transferring data between the main body and the card type input/output interface device; second connection means, coupled to the first connection means, for transferring data between an external device and the card type input/output interface device; and a card supporting the first and second connection means, the first connection means being accommodated in the main body when the card type input/output interface device is inserted into the slot provided in the main body. The main body comprises third connection means, coupled to the first connection means, for coupling the main body and the card type input/output interface device with each other. The external device comprises fourth connection means, coupled to the second connection means, for coupling the card type input/output interface device and the external device with each other.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 1:
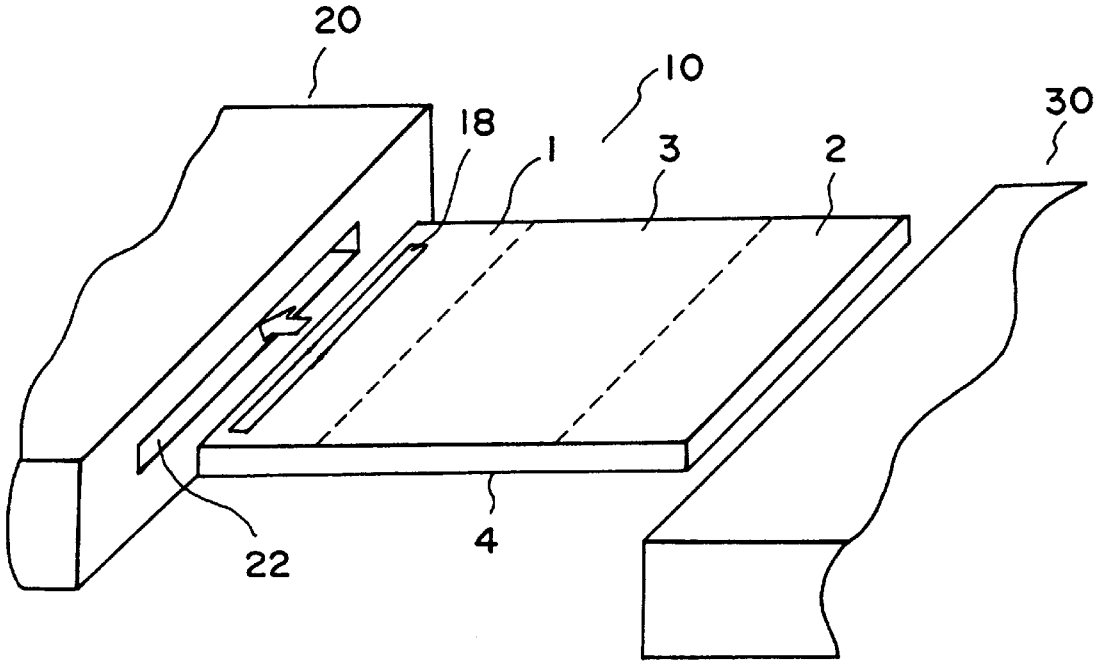
FIG. 1 is a perspective view of a first embodiment of the present invention.

Referring to FIG. 1, a card type input/output interface device 10 according to a first embodiment of the present invention comprises a card 4, a first connection part 1, a second connection part 2 and a circuit part 3. The first and second connection parts 1 and 2, and the circuit part 3 are supported by the card 4. The first connection part 1 is located on a first end portion of the card 4, the first end portion being inserted into a slot 22 formed on a sidewall of a main body 20 of an electronic device system. The second connection part 2 is located on a second end portion of the card 4, which is opposite the first connection part 1o The circuit part 3 is interposed between the first connection part 1 and the second connection part 2.

Figure 2A:
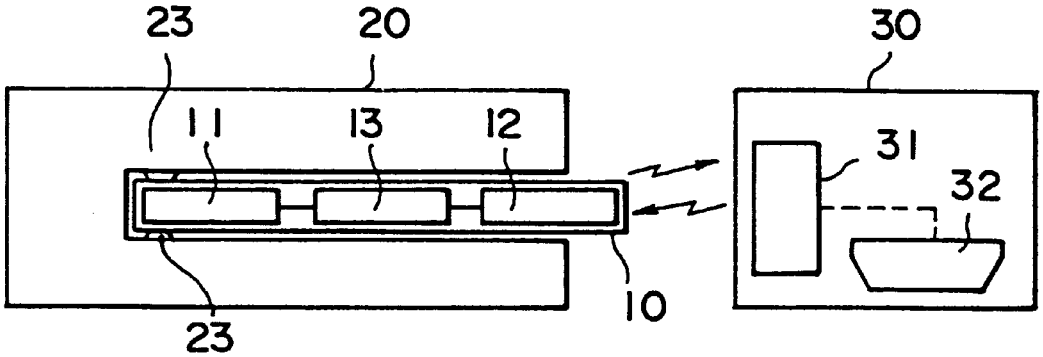
FIGS. 2A and 2B are block diagrams of the first embodiment of the present invention in more detail.

The connection part 1 comprises a connector 18 formed on a single side or both opposing sides of the card 4, as in the case of conventional IC cards. In the state where the interface device 10 has been inserted into the slot 22 of the main body 20, the connector 18 comes into contact with a connector 23 in the slot 22 of the main body 20, as shown in FIG. 2A. Signals are transferred between the main body 20 and the interface device 10 via the connectors 18 and 23.

The connection part 2 comprises a radio transmitter/receiver unit and an antenna. The antenna is, for example, a rot antenna, as will be described in detail. Signals are transferred between the interface card 10 and an external or peripheral device 30 through a radio communications channel. For this purpose, the external device 30 comprises an antenna and a radio transmitter/receiver unit, as will be described later.

The circuit part 3 comprises an antenna and a data transfer unit, as will be described in detail later. It is necessary to place the main body 20 and the external device 30 within service areas of the interface device 10 and the external device 30.

Figure 2B:
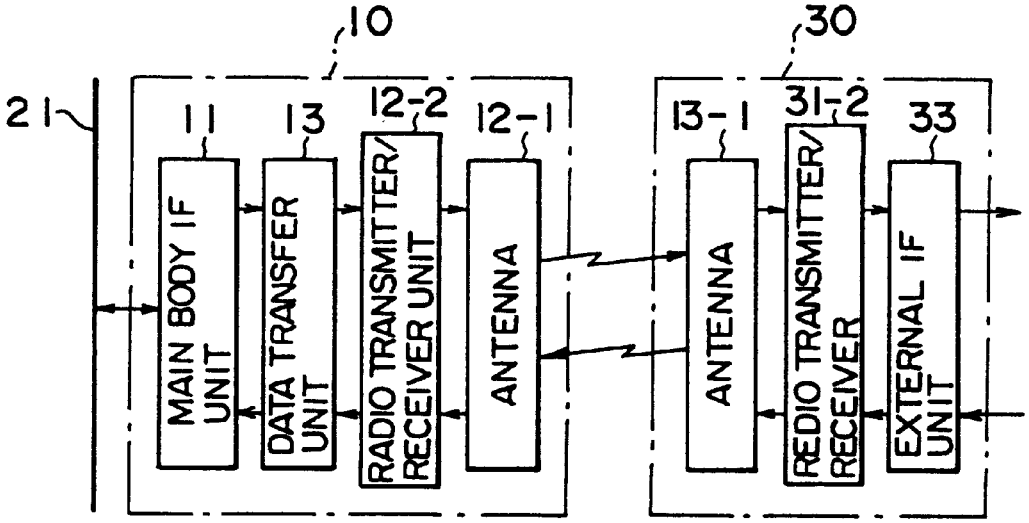

FIGS. 2A and 2B show the configuration of the first embodiment of the present invention in more detail. In FIGS. 2A and 2B, those parts which are the same as those shown in FIG. 1 are given the same reference numerals. A main body interface unit 11, which comprises the connector 18, is formed on the first contact part 1 shown in FIG. 1. An antenna 12-1 and a radio transmitter/receiver unit 12-2 are formed in the second connection part 2 shown in FIG. 1. A data transfer unit 13 is formed in the circuit part 3 shown in FIG. 1.

The aforementioned connector 23, which is electrically connected to a bus of the main body 20, has parts mounted on upper and lower inner surfaces defining the slot 22.

The external device 30, such as a printing machine or a modem, comprises a radio communications part 31 and a connector unit 32. The radio communications part 31 functions to communicate with the interface device 10 via a radio communications channel. The connector unit 32 is provided for connecting the external device 30 to another external device. The radio communications part 31 comprises an antenna 31-1 and a radio transmitter/receiver unit 31-2. The connector unit 32 comprises an external interface unit 33 comprising a connector.

Figure 3A:
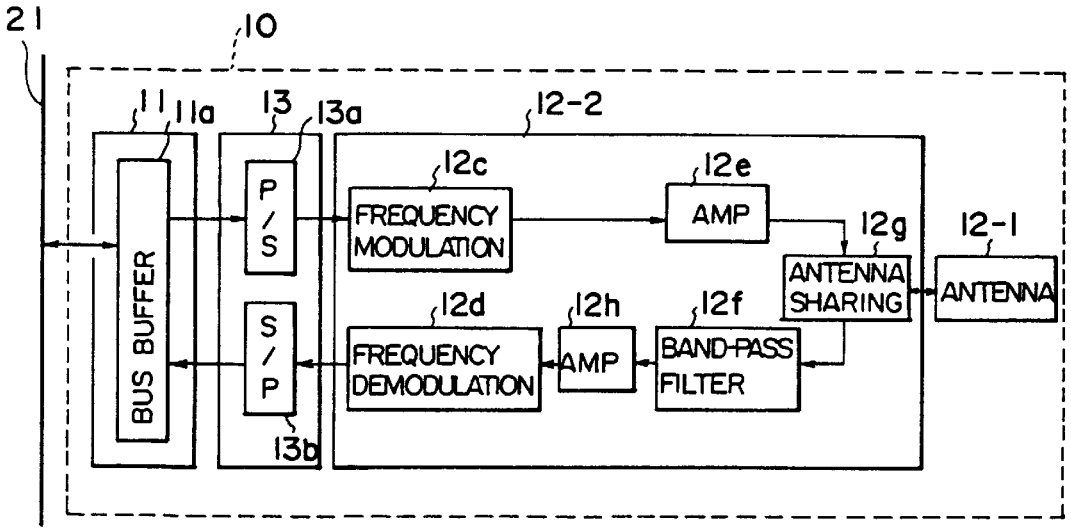
FIG. 3A is a block diagram of a card type input/output interface device shown in FIGS. 2A and 2B.

FIG. 3A shows the configuration of the interface device 10 in more detail. The main body interface unit 11 comprises a bus buffer 11a, which is electrically connected to the bus 21 via the connectors 18 and 23 (these connectors are omitted in FIG. 3A for the sake of simplicity). The data transfer unit 13 comprises a parallel-to-serial (P/S) converter 13a and a serial-to-parallel (S/P) converter 13b. Data from the bus buffer 11a is transferred in parallel form. The P/S converter 13a converts parallel data from the bus buffer 11a into serial data. The S/P converter 13b converts serial data from the radio transmitter/receiver unit 12-2.

The radio transmitter/receiver unit 12-2 comprises a frequency modulator 12c, a frequency demodulator 12d, amplifiers 12e and 12h, a band-pass filter 12f and an antenna sharing device 12g. The frequency modulator 12c modulates digital data into a frequency signal transmittable via a radio communications channel. The frequency demodulator 12d demodulates a frequency signal received from a radio communications channel into digital data. The amplifier 12e amplifies the frequency signal from the frequency modulator 12c, and the amplifier 12h amplifiers the frequency signal received. The bandpass filter 12f extracts signal components in a reception frequency band from the received frequency signal. The amplifiers 12e and 12f are coupled to the antenna 12-1 via the antenna sharing device 12g.

Figure 3B:
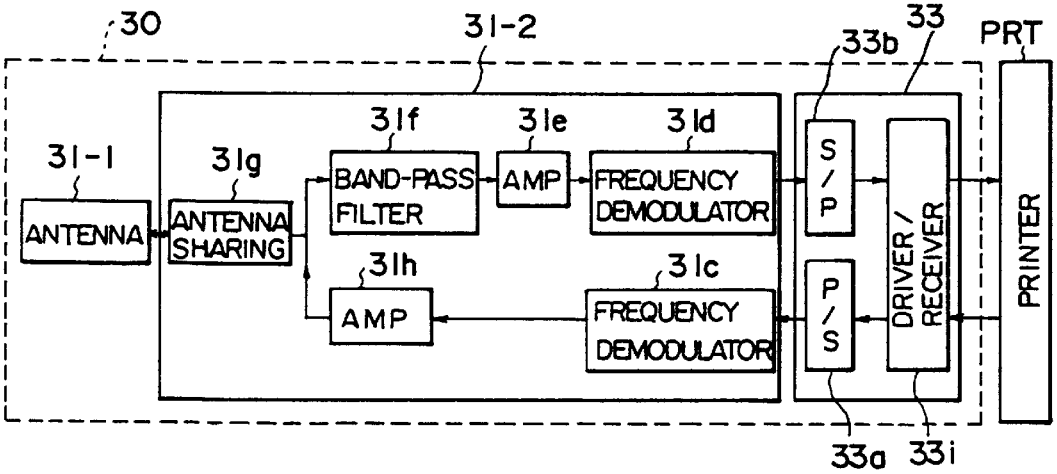
FIG. 3B is a block diagram of an external device shown in FIGS. 2A and 2B.

FIG. 3B shows the configuration of the external device 30. The radio transmitter/receiver unit 31-2 comprises an antenna sharing device 31g, a band-pass filter 31f, amplifiers 31e and 31h, a frequency demodulator 31d and a frequency modulator 31c. These structural elements of the radio transmitter/receiver unit 31-2 are the same as those in the radio transmitter/receiver unit 12-2 of the interface device 10. The external interface unit 33 of the external device 30 comprises an S/P converter 33b, a P/S converter 33a and a driver/receiver 33i. The driver/receiver 33i outputs drive signals to a printer PRT, and receives signals from the printer PRT.

The modulation type used in the first embodiment is, for example, a sub-carrier NISK method, or a FSK method. It is possible to selectively use a plurality of radio communications channels as in the case of automobile telephones and portable telephones. For example, if there is much noise in a radio communications channel, another radio communications channel will be selected. The above switching can be made if a radio communications channel interferes another device. An arbitrary frequency of the radio channel can be used. In Japan, it is preferable that the frequency of the radio channel be within a 380 MHz/250 MHz range.

Figure 4A:
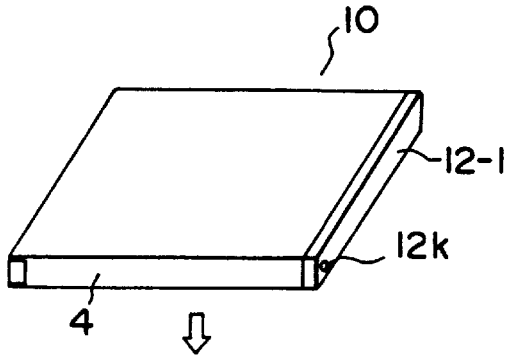
FIGS. 4A through 4D are diagrams showing an antenna used in disclosed embodiments of the present invention.
Figure 4B:
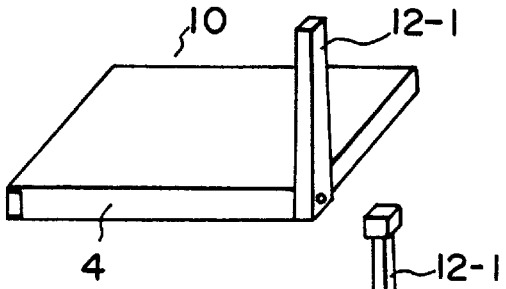
Figure 4C:
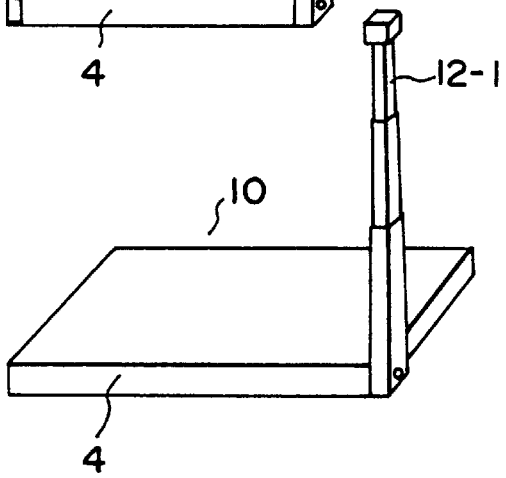
Figure 4D:
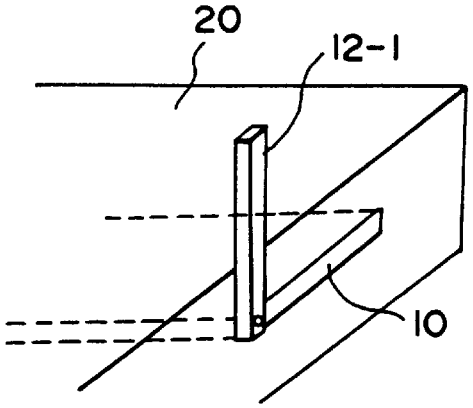

FIGS. 4A through 4D show the antenna 12-1. The antenna 12-1 shown in FIG. 4A is a rod antenna, which is rotatably supported by a screw member 12k. That is, the screw member 12k is fastened to the sidewall of the card 4 so that the rod antenna 12-1 rotates around the screw member 12k. The rod antenna 12-1 is contractible and expandable. FIG. 4A shows the contracted state of the rod antenna 12-1. When the rod antenna 12-1 is used, it is made stand upright, as shown in FIG. 4B. Then, the rod antenna 12-1 is expanded so that it has an elongated length, as shown in FIG. 4C. FIG.

4D shows the state where the interface device 10 has been inserted into the slot 22 of the main body 20. The antenna 12-1 is not limited to the rod type, but instead another type of antenna can be used. For example, the antenna 12-1 can be a conductive pattern formed on the card.

When a processor (not shown) in the main body 20 or the like specifies the external device 30 and generates an instruction to transfer data, the data transfer unit 13 of the interface device 10 receives parallel data on the bus 21 via the main body interface unit 11, and converts the parallel data into serial data. The radio transmitter/receiver unit 12-2 modulates the serial data in the predetermined modulation method, and transmits the frequency signal via the antenna 12-1. The external device receives the frequency signal via the antenna 31-1, and demodulates it into serial data. The serial data is converted into parallel data by the external interface unit 33. Further, the external interface unit 33 generates the drive signals from the parallel data, and applies the signals to the printer PRT.

When data is transferred from the external device 30 to the main body 20, serial data applied to the radio transmitter/receiver unit 31-2 via the external interface unit 33 is modulated and transmitted via the antenna 31-1. The radio transmitter/receiver unit 12-2 of the interface device 10 receives the frequency signal from the external device 30 via the antenna 12-1. The serial data output from the radio transmitter/receiver unit 12-2 is converted into parallel data by the data transfer unit 13, and output to the bus 21 via the main body interface unit 11.

The external device 30 has the connector unit 32. Thus, it is possible to transfer data received from the interface device 10 to another external device via the connector unit 32 and transfer data received from another external device to the interface device 10. The connector unit 32 conforms to, for example, the RS-232C interface. It should be noted that the main body 10 can be connected to an external device via the interface device 10 and the external device 30 as if the main body 10 is connected thereto through the connector attached to the main body 10. Hence, it becomes possible to omit the conventional connector(s) provided in the main body 20.

Figure 5:
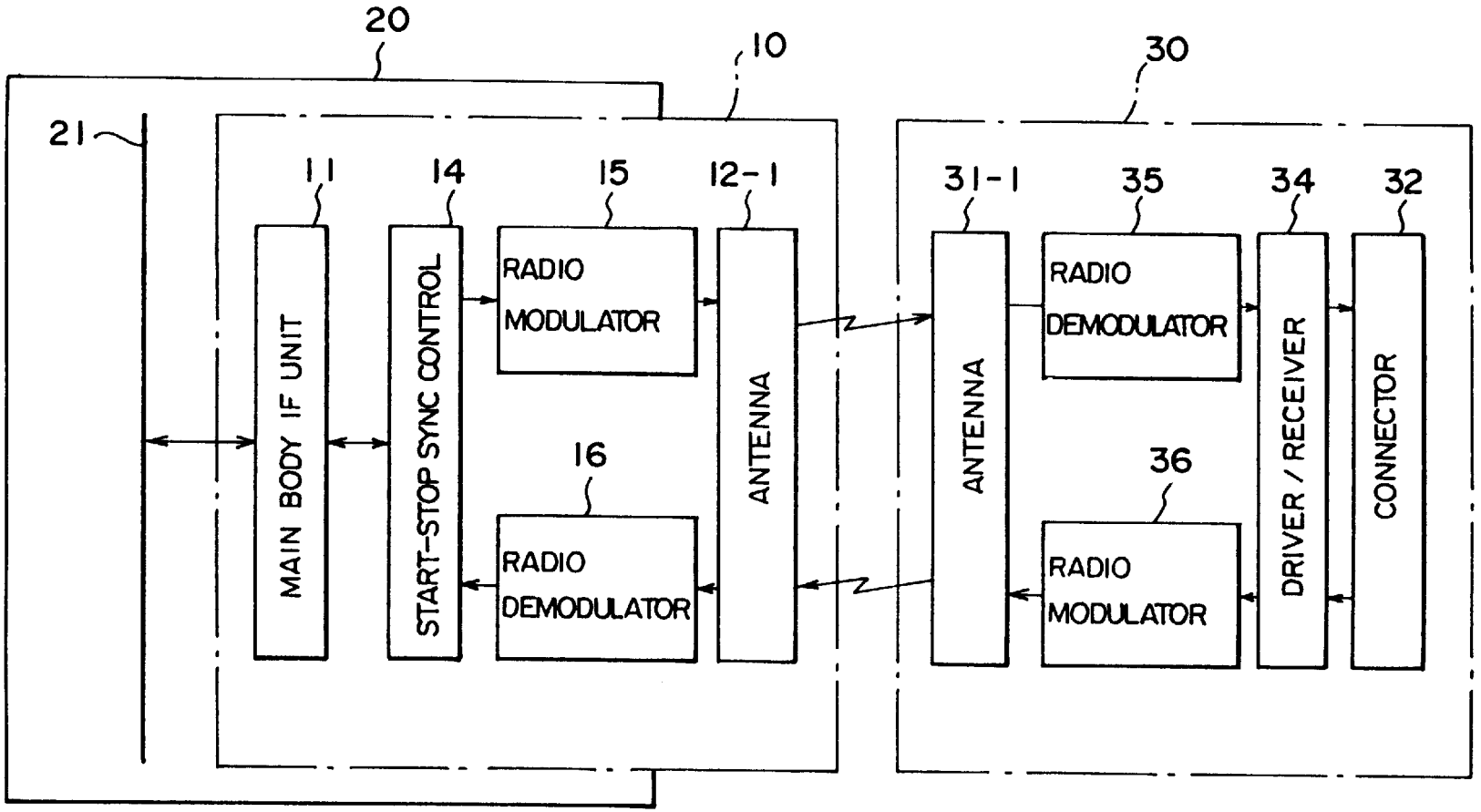
FIG. 5 is a block diagram of a second embodiment of the present invention.

FIG. 5 shows the configuration of a second embodiment of the present invention. In FIG. 5, those parts which are the same as those shown in the previously described figures are given the same reference numerals. The second embodiment of the present invention uses a start-stop system communications method. The radio transmitter/receiver unit 12-2 and the data transfer unit 13 of the interface device 10 shown in FIG. 2B are replaced by a start-stop synchronization controller 14, a radio modulator 15 and a radio demodulator 16. The radio transmitter/receiver unit 31-2 and the external interface unit 33 of the external device 30 shown in FIG. 2B are replaced by a connector 32, a driver/receiver 34, a radio demodulator 35 and a radio modulator 36.

Figure 6A:
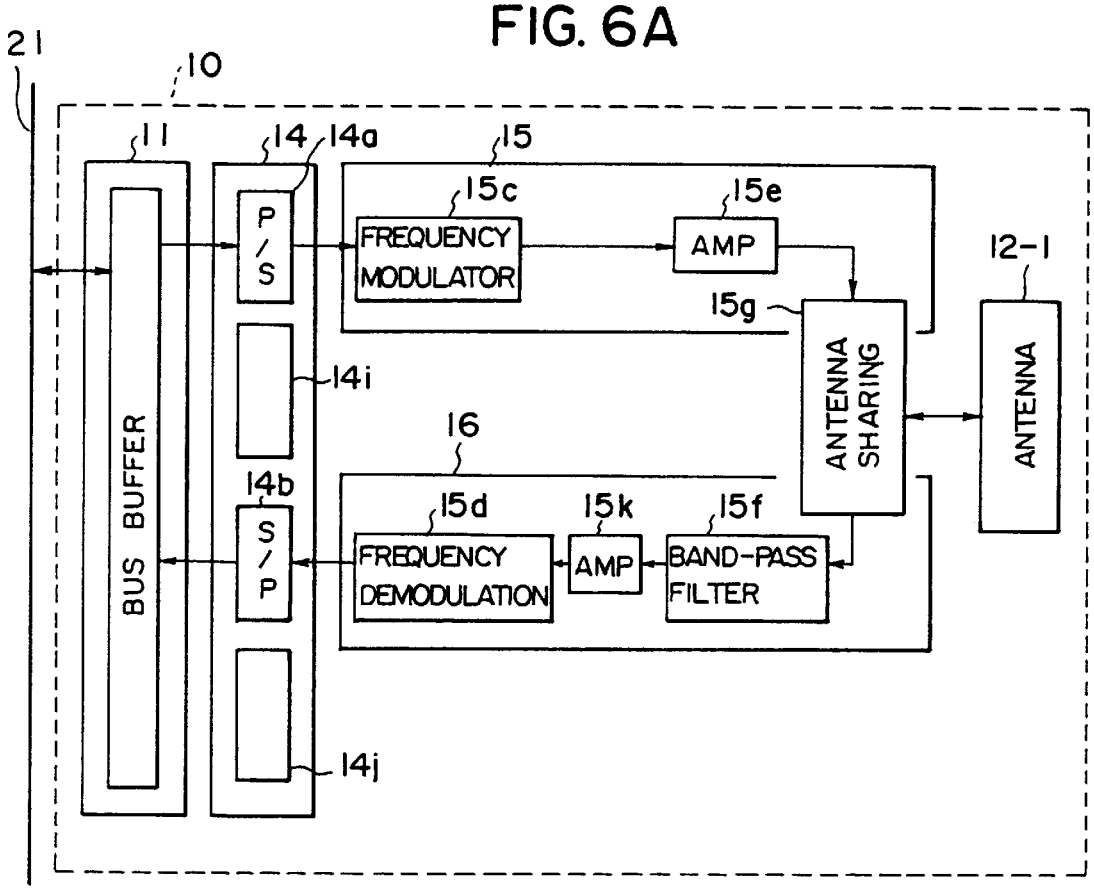
FIG. 6A is a block diagram of the card type input/output interface device used in the second embodiment of the present invention.

FIG. 6A shows the configuration of the interface device 10 according to the second embodiment of the present invention. The start-stop synchronization control unit 14 comprises a P/S converter 14a, a S/P converter 14b, a parity generator 14i, and a parity checker 14j. The parity generator 14i generates a parity bit in the start-stop synchronization and adds it to data to be transmitted. The parity checker 14j checks the parity check in data received from the external device 30. The radio modulator 15 comprises a frequency modulator 15c, an amplifier 15e and an antenna sharing device 15g. The radio demodulator 16 comprises the antenna sharing device 15g, a band-pass filter 15f, an amplifier 15k and a frequency demodulator 15d.

Figure 6B:
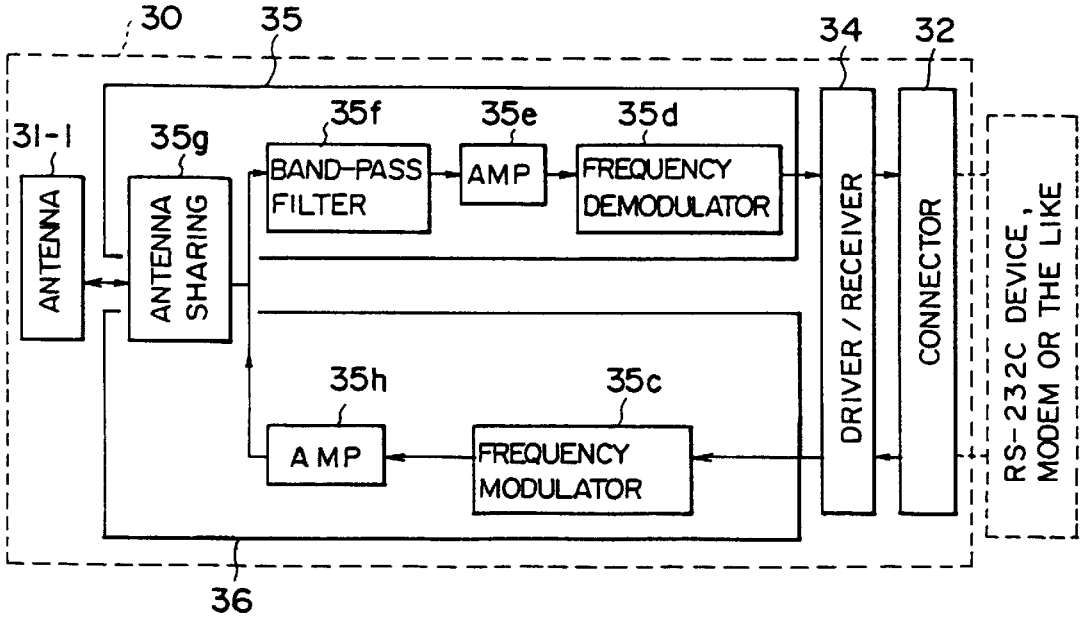
FIG. 6B is a block diagram of an external device used in the second embodiment of the present invention.

FIG. 6B shows the configuration of the interface device 30 according to the second embodiment 35 of the present invention. The radio demodulator comprises an antenna sharing device 35g, a band-pass filter 35f, an amplifier 35e and a frequency demodulator 35d. The radio modulator 36 comprises the antenna sharing device 35g, an amplifier 35k.

The interface device 10 is inserted into the slot 22 of the main body 20 in the same manner as the interface device 10 of the first embodiment of the present invention. The interface device 10 is connected to the bus 21 via the main body interface unit 11. The external device 30 is positioned within the service areas of the interface device 10 and the external device 30. Another external device, such as a modem, is connected to the external device 30 via the connector 32.

The processor in the main body 20 or the like specifies the external device 30 and generates an instruction to transfer data. Then the start-stop synchronization control unit 14 receives data via the bus 21 and main interface unit 11, and converts it into serial start-stop system data. The radio modulator 15 modulates the data from the control unit 14, and transmits a frequency signal via the antenna 21-1.

The radio demodulator 35 of the external device 30 demodulates the frequency signal received via the antenna 31-1. Demodulated start-stop system data is applied to the connector 32 through the driver/receiver 34. In this manner, an external device in conformity to a predetermined interface, such as the RS-232C interface, can be connected to the main body 20 as in the case of a main body having a connector for external connection.

Figure 8:
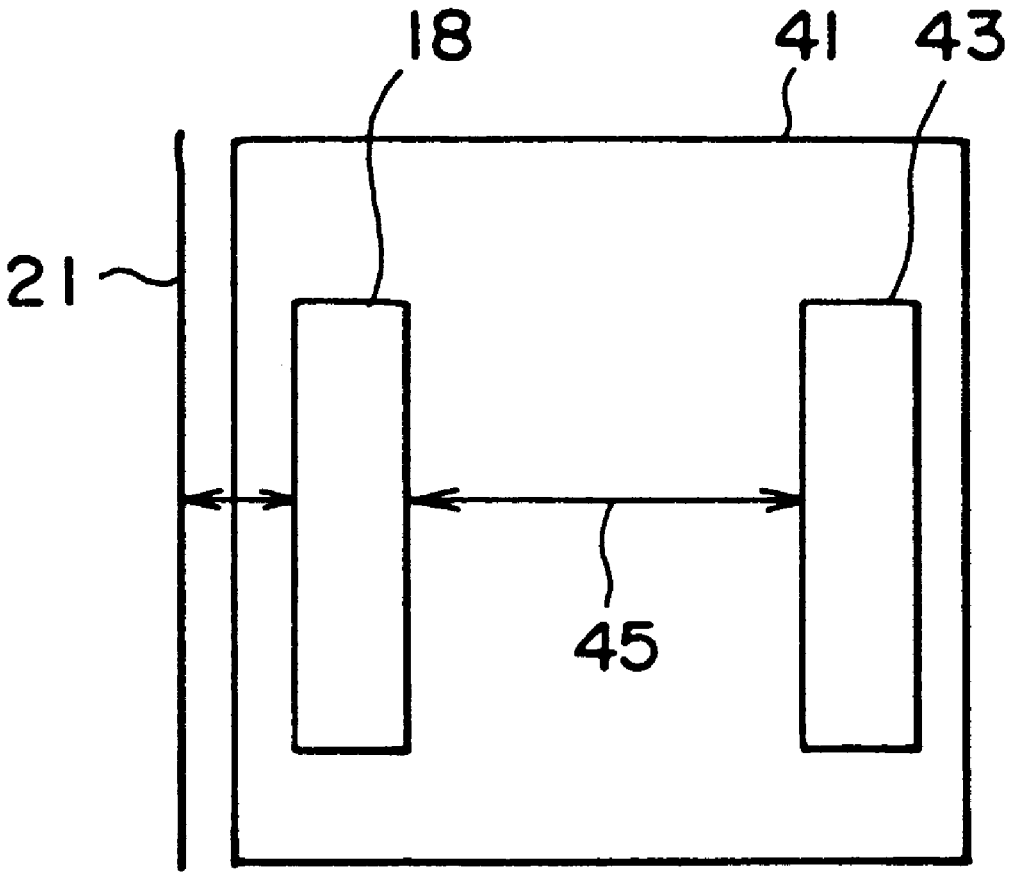
FIG. 8 is a block diagram of the card type input/output interface device of the third embodiment of the present invention.

A description will now be given of a third embodiment of the present invention. A card type input/output interface device 41 has a projection 42a formed in the aforementioned second connection part 2. The projection 42a upwardly projects from a surface of the card. As shown in FIG. 8, the aforementioned connector 18 is formed in the first connection part opposite the projection 42a. The width of the projection 42a in the direction perpendicular to the direction in which the interface device 41 is inserted into the slot 22 of the main body 20 is the same as that of the card 4. A connector 43 is formed in the projection unit 42a so that it accommodates a cable connector 44 of a cable 45 in the direction in which the interface device 41 is inserted into the slot of the main body 20. As shown in FIG. 8, the connector 43 is electrically connected to the connector 18 through a conductive line formed in the card. The projection 42a is located outside the main body 20 when the interface device 41 has been inserted into the main body 20. It is also possible to design the projection 42a so that it is accommodated in the main body 20.

Figure 7A:
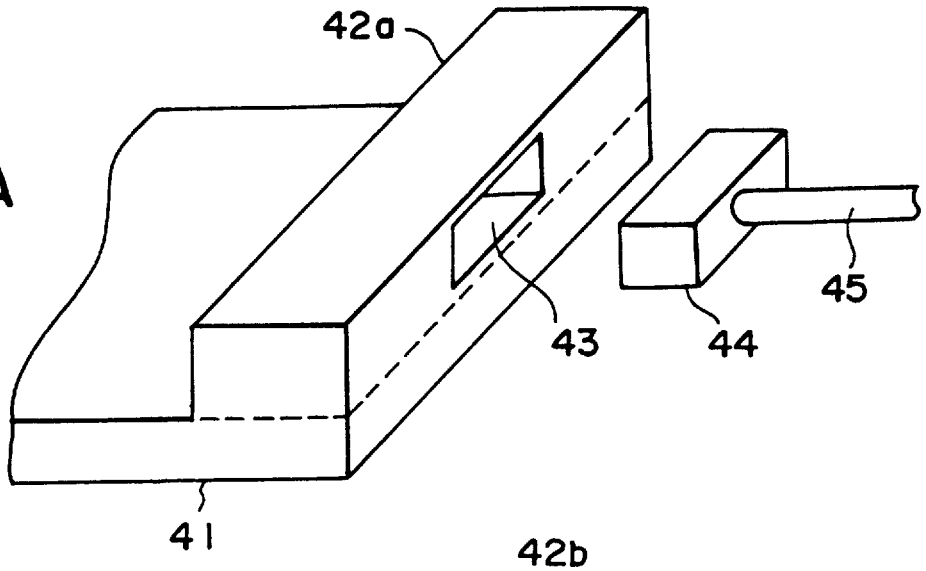
FIG. 7A is a perspective view of a third embodiment of the present invention.
Figure 7B:
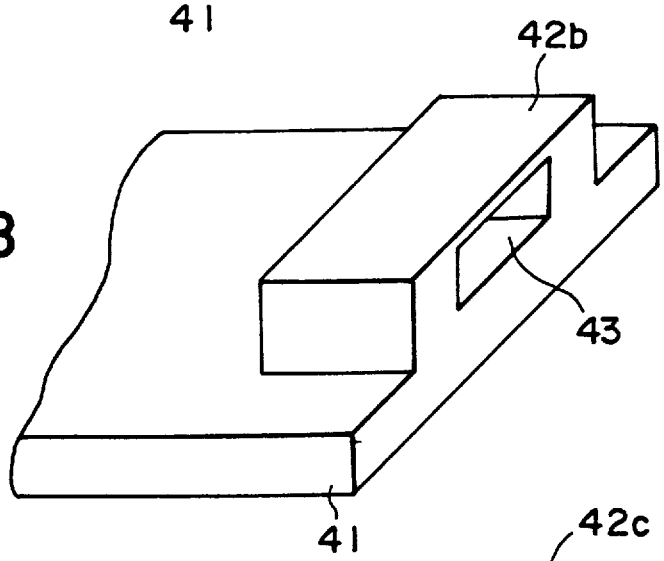
FIG. 7B is a perspective view of a variation of the structure shown in FIG. 7A.

FIG. 7B shows a first variation of the interface device 41, which has a projection 42b. As shown in FIG. 7B, the width of the projection 42b is smaller than that of the card. This means that the projection 42b has a width sufficient to provide the connector 43. It is possible to select the dimensions of the projection 42b so that the projection 42b is housed in the main body 20 when it is inserted into the slot 22.

Figure 7C:
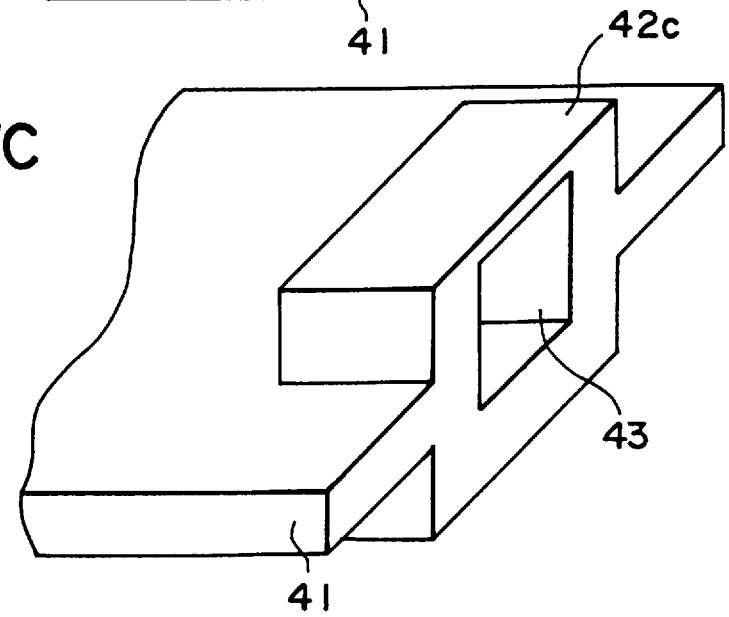
FIG. 7C is a perspective view of a variation of the structure shown in FIG. 7B.

FIG. 7C shows a second variation of the interface device 41 shown in FIG. 7B. The interface device 41 shown in FIG. 7C has a projection 42 which projects from both opposing surfaces of the card. A person can grip the projection 42c from both sides thereof. Hence, it is easy to insert the interface device 41 into the slot 22 and detach it therefrom.

Figure 9A:
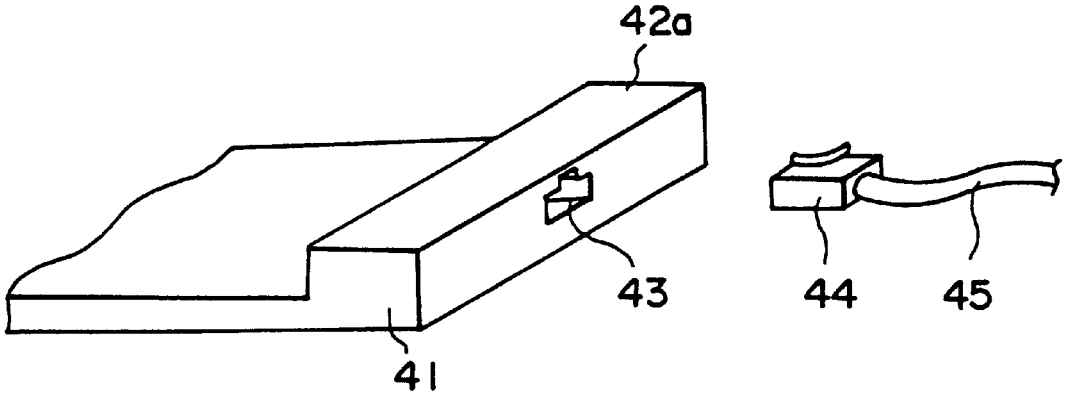
FIGS. 9A through 9C are perspective views of card type input/output interface devices in which 6-pin modular connectors are used.
Figure 9B:
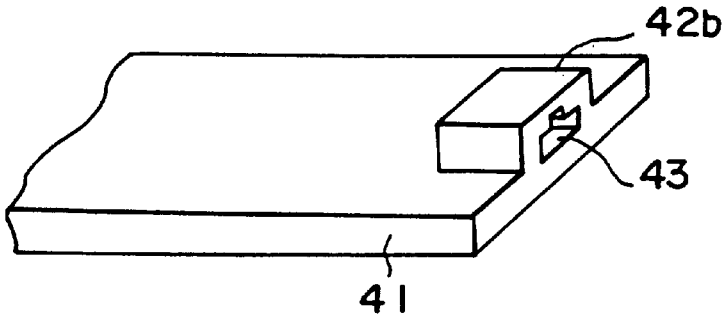
Figure 9C:
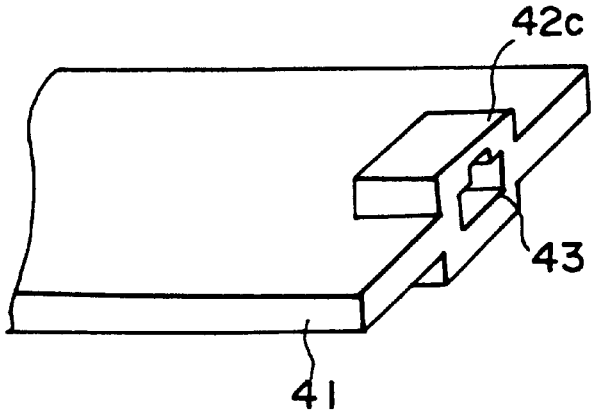

FIGS. 9A, 9B and 9C show the card type input/output interface devices 41 shown in FIGS. 7A, 7B and 7C in which the connectors 43 and 44 are formed with 6-pin modular connectors. It is possible to form the modular 44 so that it is 7 mm×7 mm in length and breadth. When the card is 3 mm thick, the projection 42a is designed to have a thickness of approximately 6 mm. Thus, the total thickness is equal to approximately 9 mm–10 mm. This thickness does not degrade the performance of the IC cards.

Figure 10A:
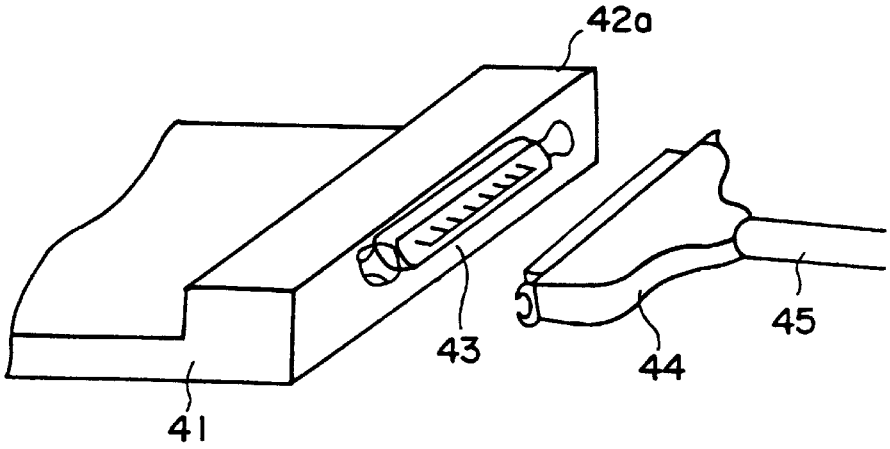
FIGS. 10A through 10C are perspective views of card type input/output interface devices in which Centro-connectors are used.
Figure 10B:
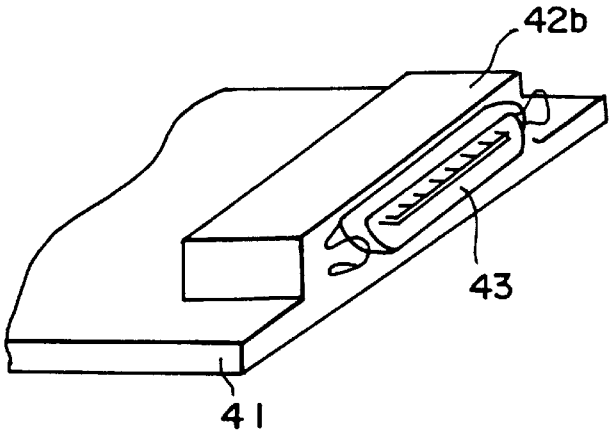
Figure 10C:
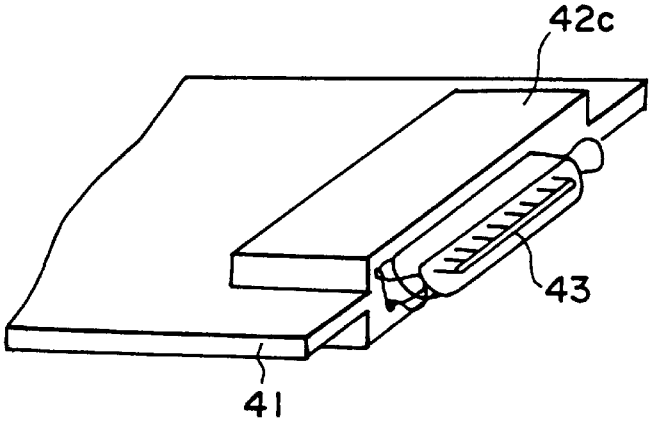

FIGS. 10A, 10B and 10C show the card type input/output interface devices 41 shown in FIGS. 7A, 7B and 7C in which the connectors 43 and 44 are formed with 6-pin Centro-connectors which conform to the Centronics.

Figure 11A:
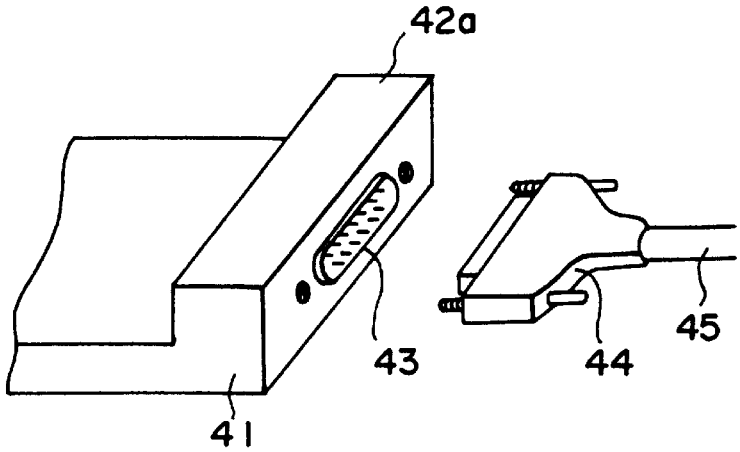
FIGS. 11A through 11C are perspective views of card type input/output interface devices in which RS-232C connectors are used.
Figure 11B:
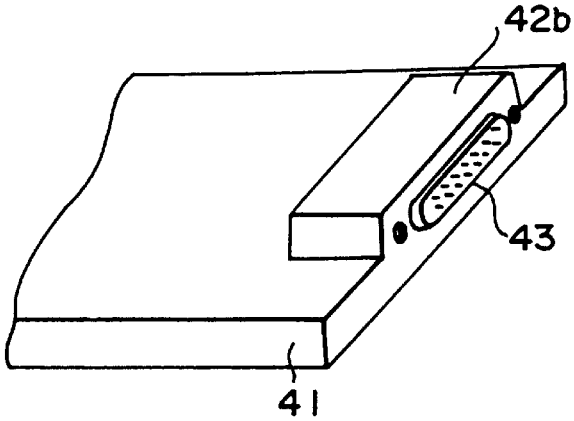
Figure 11C:
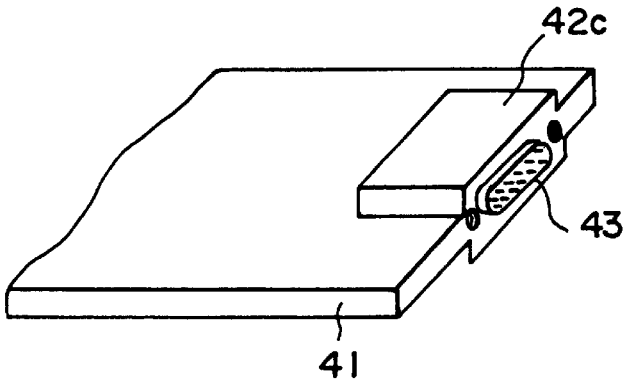

FIGS. 11A, 11B and 11C show the card type input/output interface devices 41 shown in FIGS. 7A, 7B and 7C in which the connectors 43 and 44 are formed with RS-232C connectors which conform to the RS-232C interface.

According to the present invention, the card type input/output interface device that is inserted into the slot of the electronic device systems can be provided. The interface device of the present invention can facilitate down-sizing and cost reducing of the electronic device systems because connectors for external connection can be omitted. Further, it is easy to connect the electronic device systems to various types of interface connectors by providing various types of the interface devices as shown in FIGS. 9A–9C through 11A–11C. This increases the functions of the main body. Furthermore, the use of electronic elements as shown in FIGS. 3A, 3B, 6A and 6B provides various types of interface between the main body and external devices. Particularly, the use of radio transmitter/receiver units can provide the card type input/output interface devices having a thickness almost the same as the thicknesses of conventional IC memory cards and IC cards. It should be noted that the card type input/output interface device is open to the external environment while the conventional cards operate in the closed environment.

In the embodiments described in the foregoing, connections between the main body 20 and the interface device 10 are made by means of the direct-contact structure. Alternatively, it is possible to make these connections by means of a non-contact structure by using, for example, a radio transmitter/receiver unit as in the case of making connections between the interface device 10 and the external device 30.

The present invention is not limited to the specifically disclosed embodiments and variations and modifications may be made without departing from the scope of the present invention.

What is claimed is:

[1. A card type input/output interface device comprising:

first data transmission means for transferring data between a main body of an electronic device and the card type input/output interface device;

second data transmission means, coupled to said first data transmission means, for transferring data between an external device and the card type input/output interface device; and a card supporting said first and second data transmission means, said first data transmission means being accommodated in said main body when the card type input/output interface device is inserted into a slot provided in said main body of the electronic device so as to transfer data between said card type input/output interface device and said electronic device.]

2. A card type input/output interface device as claimed in claim [1] *38*, wherein said second data [transmission means] *interface unit* comprises radio transmitter/receiver means for transferring the data between said external device and the card type input/output interface device through a radio communications channel.

[3. A card type input/output interface device as claimed in claim 2, and further comprising data transfer circuit means, interposed between said first and second data transmission means, for providing an interface of data transfer between said first data transmission means and said radio transmitter/receiver means.]

4. A card type input/output interface device as claimed in claim 2, wherein said second data [transmission means] *interface unit* comprises an antenna coupled to said radio transmitter/receiver means.

5. A card type input/output interface device as claimed in claim 4, wherein said antenna is a rod type antenna.

6. A card type input/output interface device as claimed in claim 4, wherein said antenna is a rod type antenna which is contractible and expandable.

7. A card type input/output interface device as claimed in claim 4, wherein said antenna is a rod type antenna which is contractible and expandable and which is rotatably supported to said card.

8. A card type input/output interface device as claimed in claim 4, wherein said antenna is an edge portion of said card.

9. A card type input/output interface device as claimed in claim [1] *38*, wherein:

said card has a projection in which said second data [transmission means] *interface unit* is provided;

said first data [transmission means] *interface unit* is located in a first end portion of said card and said second data [transmission means] *interface unit* is located in a second end portion opposite said first end portion; and a thickness of said second end portion of said card including said projection is greater than a thickness of said first end portion of said card.

10. A card type input/output interface device as claimed in claim 9, wherein said projection upwardly projects from a surface of said card.

11. A card type input/output interface device as claimed in claim 9, wherein said projection projects upwardly and downwardly projects from opposing surfaces of said card.

12. A card type input/output interface device as claimed in claim 9, wherein:

said card has a first width in said first end portion;

said projection has a second width in said second end portion; and said first width is equal to said second width.

13. A card type input/output interface device as claimed in claim 9, wherein:

said card has a first width in said first end portion;

said projection has a second width in said second end portion; and said second width is smaller than said first width.

14. A card type input/output interface device as claimed in claim 9, wherein said second data [transmission means] *interface unit* comprises a connector formed in said projection for electrically connecting the card type input/output interface device to said external device.

15. A card type input/output interface device as claimed in claim 14, wherein said connector is a pin modular connector.

16. A card type input/output interface device as claimed in claim 14, wherein said connector is a Centro-connector.

17. A card type input/output interface device as claimed in claim 14, wherein said connector is an RS-232C connector.

18. A card type input/output interface device as claimed in claim [1] *38*, wherein said first data [transmission means]

*interface unit* comprises a connector for electrically connecting said [the] card type input/output interface device to said electronic device.

[19. An electronic device system comprising:

a main body of an electronic device, said main body comprising a slot;

a card type input/output interface device operable to be inserted into said slot; and an external device, wherein said card type input/output interface device comprises:

first data transmission means for transferring data between the main body and the card type input/output interface device;

second data transmission means, coupled to said first data transmission means, for transferring data between said external device and said card type input/output interface device; and a card supporting said first and second data transmission means, said first data transmission means being accommodated in said main body when said card type input/output interface device is inserted into said slot provided in the main body so as to transfer data between said external device and said card type input/output device and said electronic device, and wherein:

the main body comprises third data transmission means, coupled to said first data transmission means, for coupling the main body and said card type input/output interface device with each other and transferring data therebetween; and said external device comprises fourth data transmission means, coupled to said second data transmission means, for coupling said card type input/output interface device and said external device with each other and transferring data therebetween.]

20. An electronic [device] system as claimed in claim [19] *39*, wherein:

said second data [transmission means] *interface unit* comprises first radio transmitter/receiver means for transferring the data between said external device and said card type input/output interface device through a radio communications channel[; and said fourth data transmission means comprises second radio transmission/receiver means for transferring the data between said external device and said card type input/output interface device through said radio communications channel].

[21. An electronic device system as claimed in claim 19, wherein said card type input/output interface device further comprises data transfer circuit means, interposed between said first and second data transmission means, for providing an interface of data transfer between said first data interface unit and said first radio transmitter/receiver means.]

22. An electronic [device] system as claimed in claim 20, wherein:

said second data [transmission means] *interface unit* comprises a first antenna coupled to said first radio transmitter/receiver means[; and said fourth data transmission means comprises a second antenna coupled to said second radio transmitter/receiver means].

23. An electronic [device] system as claimed in claim 22, wherein said first antenna is a rod type antenna.

24. An electronic [device] system as claimed in claim 22, wherein said first antenna is a rod type antenna which is contractible and expandable.

25. An electronic [device] system as claimed in claim 22, wherein said first antenna is a rod type antenna which is contractible and expandable and which is rotatably supported to said card.

26. An electronic [device] system as claimed in claim 22, wherein said first antenna is an edge portion of said card.

27. An electronic [device] system as claimed in claim [19] *39*, wherein:

said card has a projection in which said second data [transmission means] *interface unit* is provided;

said first data [transmission means] *interface unit* is located in a first end portion of said card and said second [connection means] data interface unit is located in a second end portion opposite said first end portion; and a thickness of said second end portion of said card including said projection is greater than a thickness of said first end portion of said card.

28. An electronic [device] system as claimed in claim 27, wherein said projection upwardly projects from a surface of the card.

29. An electronic [device] system as claimed in claim 27, wherein said projection projects upwardly and downwardly [projects] from opposing surfaces of said card.

30. An electronic [device] system as claimed in claim 27, wherein:

said card has a first width in said first end portion;

said projection has a second width in said second end portion; and said first width is equal to said second width.

31. An electronic [device] system as claimed in claim 27, wherein:

said card has a first width in said first end portion;

said projection has a second width in said second end portion; and said second width is smaller than said first width.

32. An electronic [device] system as claimed in claim 27, wherein said second data [transmission means] *interface unit* comprises a connector formed in said projection for electrically connecting said card type input/output interface device to said external device.

33. An electronic [device] system as claimed in claim 32, wherein said connector is a pin modular connector.

34. An electronic [device] system as claimed in claim 32, wherein said connector is a Centro-connector.

35. An electronic [device] system as claimed in claim 32, wherein said connector is an RS-232C connector.

36. An electronic [device] system as claimed in claim [19] *39*, wherein said first data [transmission means] *interface unit* comprises a connector for electrically connecting said card type input/output interface device to [said] *a* main body *of the electronic device*.

37. An electronic [device] system as claimed in claim 20, wherein said external device comprises [fifth] *a third* data [transmission means] *interface unit*, coupled to [said] *a* second radio transmitter/receiver means, for coupling said external device to another external device and transferring data therebetween.

*38. A card type input/output interface device for operatively connecting an electronic device to an external device, comprising:*

*a card, to be inserted into a slot provided in the electronic device;*

*a first data interface unit, provided on one end of the card, for coupling to the electronic device to transfer input*

*information to the electronic device and output information from the electronic device when the card is inserted into the slot;*

*a second data interface unit, provided on an opposing end of the card, for coupling to the external device to transfer the output information to the external device and the input information from the external device; and*

*a data transfer circuit, incorporated with the card, in response to the input information being received by the second data interface unit, for transferring the input information to the first data interface unit and, in response to the output information being received by the first data interface unit, for transferring the output information to the second data interface unit.*

*39. An electronic system, comprising:*

*an electronic device, provided with a slot thereof;*

*an external device providing a peripheral function for the electronic device;*

*a card, inserted into the slot of the electronic device, for coupling the electronic device to the external device;*

*a first data interface unit, provided on one end of the card, for coupling to the electronic device to transfer input information to the electronic device and output information from the electronic device;*

*a second data interface unit, provided on an opposing, end of the card, for coupling to the external device to transfer the output information to the external device and the input information from the external device; and*

*a data transfer circuit, incorporated with the card, in response to the input information being received by the second data interface unit, for transferring the input information to the first data interface unit and, in response to the output information being received by the first data interface unit, for transferring the output information to the second data interface unit.*

*40. A card type input/output interface device for operatively connecting an electronic device to an external device, comprising:*

*a card, to be inserted into a slot provided in the electronic device, provided with a first end portion and a second end portion opposite to the first end portion;*

*a data transfer circuit, incorporated with the card, for transferring information between the electronic device and the external device;*

*a first data connector, provided on the first end portion of the card, for electrically connecting the data transfer circuit to the electronic device when the card is inserted into the slot; and*

*a second data connector, provided on the second end portion of the card, for coupling the data transfer circuit to the external device.*

*41. A card type input/output interface device for operatively connecting an electronic device to an external device, comprising:*

*a card, to be inserted into a slot provided in the electronic device;*

*a data connector for transferring input information to the electronic device and output information from the electronic device when the card is inserted into the slot;*

*a wireless data transmitter/receiver for transmitting the output information to the external device and for receiving the input information from the external device via a wireless communication channel; and*

*a data transfer circuit, in response to receiving the input information by the wireless data transmitter/receiver, for transferring the input information to the data connector and, in response to receiving the output information by the data connector, for transferring the output information to the wireless data transmitter/receiver,*

*wherein the data connector, the wireless data transmitter/receiver and the data transfer circuit are incorporated with the card.*

*42. A card type input/output interface device according to claim 41, wherein the wireless data transmitter/receiver transmits the output information to the external device and receives the input information from the external device via a radio communication channel.*

*43. A card type input/output interface device for operatively connecting an electronic device to an external device, comprising:*

*a card, to be inserted into a slot provided in the electronic device;*

*a converter for receiving a parallel bit digital information from the electronic device and for converting the parallel bit digital information into a serial bit digital information when the card is inserted into the slot; and,*

*a data transfer circuit for transferring the serial bit digital information from the converter to the external device,*

*wherein the converter and the data transfer circuit are incorporated with the card.*

*44. A card type input/output interface device for operatively connecting an electronic device to an external device, comprising:*

*a card, provided with a first end portion and a second end portion, opposite to the first end portion, having a thickness greater than a thickness of the first end portion;*

*data transfer circuit, incorporated with the card, for transferring information between the electronic device and the external device;*

*a first data connector, provided on the first end portion of the card, for electrically connecting the data transfer circuit to the electronic device when the first end portion of the card is inserted into a slot provided in the external wall in the body of the electronic device; and*

*a second data connector, provided on the second end portion, for coupling the data transfer circuit to the external device.*

*45. A system, to be operatively connected to an electronic device, comprising:*

*an external device providing a peripheral function for the electronic device;*

*a card, electrically connected to the external device to be inserted into a slot provided in the electronic device;*

*a first data interface unit for transmitting input information to the electronic device and for receiving output information from the electronic device when the card interface is inserted into the slot;*

*a second data interface unit for transmitting the output information to the external device and for receiving the input information from the external device; and*

*a data transfer circuit, in response to receiving the input information by the second data interface unit, for transferring the input information to the first data interface unit and, in response to receiving the output information by the first data interface unit, for transferring the output information to the second data interface unit,*

*wherein the first data interface unit, the second interface unit and the data transfer circuit are incorporated with card.*

*46. A system, to be operatively connected to an electronic device, comprising:*

*an external device providing a peripheral function for the electronic device;*

*a card, provided with a first end portion and a second end portion opposite to the first end portion, to be inserted into a slot provided in the electronic device;*

*a data transfer circuit, incorporated with the card, for transferring information between the electronic device and the external device;*

*a first connector, provided on the first end portion of the card, for electrically connecting the data transfer circuit to the electronic device when the first end portion of the card is inserted into the slot; and*

*a second connector, provided on the second end portion of the card, for electrically connecting the data transfer circuit to the external device.*

*47. A system, to be operatively connected to an electronic device, comprising:*

*an external device providing a peripheral function for the electronic device;*

*a card interface, operatively connected to the external device via a wireless communication channel, to be inserted into a slot provided in the electronic device;*

*a data connector for transferring input information to the electronic device and output information from the electronic device when the card interface is inserted into the slot;*

*a wireless data transmitter/receiver for transmitting the output information to the external device and for receiving the input information from the external device via the wireless communication channel; and*

*a data transfer circuit, in response to receiving the input information by the wireless data transmitter/receiver, for transferring the input information to the data connector and, in response to receiving the output information by the data connector, for transferring the output information to the wireless data transmitter/receiver,*

*wherein the data connector, the wireless data transmitter/receiver and the data transfer circuit are incorporated with the card.*

*48. A system according to claim 47, wherein the wireless data transmitter/receiver transmits the output information to the external device and receives the input information from the external device via a radio communication channel.*

*49. A system, to be operatively connected to an electronic device, comprising:*

*an external device providing a peripheral function for the electronic device;*

*a card interface, operatively connected to the external device, to be inserted into a slot provided in the electronic device;*

*a converter for receiving a parallel bit digital information from the electronic device and for converting the parallel bit digital information into a serial bit digital information when the card interface is inserted into the slot; and,*

*a data transfer circuit for transferring the serial bit digital information from the converter to the external device,*

*wherein the converter and the data transfer circuit are incorporated with the card.*

*50. A system, to be operatively connected to an electronic device, comprising:*

*an external device providing a peripheral function for the electronic device;*

*a card, provided with a first end portion and a second end portion, opposite to the first end portion, having a thickness greater than a thickness of the first end portion;*

*a data transfer circuit, incorporated with the card, for transferring information between the electronic device and the external device;*

*a first data connector, provided on the first end portion of the card, for electrically connecting the data transfer circuit to the electronic device when the first end portion of the card is inserted into a slot provided in an external wall in the body of the electronic device; and*

*a second data connector, provided on the second end portion, for coupling the data transfer circuit to the external device.*

*51. An electronic system comprising:*

*an electronic device, provided with a slot;*

*an external device providing a peripheral function for the electronic device;*

*a card, provided with a first end portion and a second end portion opposite to the first end portion, the first end portion inserted into the slot of the electronic device;*

*a data transfer circuit, incorporated with card, for transferring information between the electronic device and the external device;*

*a first data connector, provided on the first end portion of the card, for electrically connecting the data transfer circuit to the electronic device; and*

*a second data connector, provided on the second end portion of the card, for coupling the data transfer circuit to the external device.*

*52. An electronic system, comprising:*

*an electronic device, provided with a slot;*

*an external device providing a peripheral function for the electronic device;*

*a card, inserted into the slot of the electronic device, for operatively connecting the electronic device to the external device via a wireless communication channel;*

*a data connector for transferring input information to the electronic device and for receiving output information from the electronic device;*

*a wireless data transmitter/receiver for transmitting the output information to the external device and for receiving the input information from the external device via the wireless communication channel; and*

*a data transfer circuit, in response to receiving the input information by the wireless data transmitter/receiver, for transferring the input information to the data connector and, in response to receiving the output information by the connector, for transferring the output information to the wireless data transmitter/receiver,*

*wherein the data connector, the wireless data transmitter/receiver and the data transfer circuit are incorporated with the card.*

*53. An electronic system according to claim 52, wherein the wireless data transmitter/receiver transmits the output information to the external device and receives the input information from the external device via a radio communication channel.*

*54. An electronic system comprising:*

*an electronic device, provided with a slot;*

*an external device providing a peripheral function for the electronic device;*

*a card, inserted into the slot of the electronic device, and operatively connecting the electronic device to the external device;*

*a converter for receiving a parallel bit digital information from the electrical device and for converting the parallel bit digital information into a serial bit digital information;*

*a data transfer circuit for coupling the serial bit digital information from the converter to the external device,*

*wherein the converter and the data transfer circuit are incorporated with the card.*

*55. An electronic system, comprising:*

*an electronic device, provided with a slot;*

*an external device providing a peripheral function for the electronic device;*

*a card, provided with a first end portion inserted into the slot of the electronic device and a second end portion opposite to the first end portion, having a thickness greater than a thickness of the first end portion;*

*a data transfer circuit, incorporated with the card, for transferring information between the electronic device and the external device;*

*a first data connector, provided on the first end portion of the card, for electrically connecting the data transfer circuit to the electronic device when the card is inserted into the slot; and*

*a second data connector, provided on the second end portion, for coupling the data transfer circuit to the external device.*

* * * * *

UNITED STATES PATENT AND TRADEMARK OFFICE

CERTIFICATE OF CORRECTION

PATENT NO. : RE 36,769 C1
APPLICATION NO. : 90/008071
DATED : December 8, 2009
INVENTOR(S) : Ozawa et al.

It is certified that error appears in the above-identified patent and that said Letters Patent is hereby corrected as shown below:

Title page should be deleted and replace with the attached title page.

On the title page, item (10) Number: should read -- US RE36,769 C1 --

Signed and Sealed this

Twenty-ninth Day of June, 2010

David J. Kappos

David J. Kappos
*Director of the United States Patent and Trademark Office*

(12) EX PARTE REEXAMINATION CERTIFICATE (7213th)

United States Patent (10) Number: US RE36,769 C1 --
Ozawa et al. (45) Certificate Issued: Dec. 8, 2009

(54) CARD TYPE INPUT/OUTPUT INTERFACE DEVICE AND ELECTRONIC DEVICE USING THE SAME

(75) Inventors: Masayuki Ozawa, Sagamihara (JP); Shigeru Suzuki, Kawasaki (JP)

(73) Assignee: Fujitsu Limited, Nakaharu-Ku, Kawasaki-Shi, Kanagawa (JP)

Reexamination Request:
No. 90/007,546, May 18, 2005
No. 90/008,071, Jun. 28, 2006

Reexamination Certificate for:
Patent No.: Re. 36,769
Issued: Jul. 11, 2000
Appl. No.: 08/731,754
Filed: Oct. 18, 1996

Related U.S. Patent Documents

Reissue of:
(64) Patent No.: 5,357,091
Issued: Oct. 18, 1994
Appl. No.: 07/875,800
Filed: Apr. 30, 1992

(30) Foreign Application Priority Data

Apr. 30, 1991 (JP) ..... 3-124635

(51) Int. Cl.
*G06K 19/06* (2006.01)

(52) U.S. Cl. ..... 235/380; 235/492; 235/486
(58) Field of Classification Search ..... None
See application file for complete search history.

(56) References Cited

U.S. PATENT DOCUMENTS

| | | | | |
|---|---|---|---|---|
| 1,484,648 | A | 2/1924 | Jenkins | |
| 3,936,833 | A | 2/1976 | Bush | 343/225 |
| 4,250,563 | A | 2/1981 | Struger | 364/900 |
| 4,286,262 | A | 8/1981 | Wahl | 340/694 |
| 4,362,905 | A | 12/1982 | Ismail | 179/1 PC |
| 4,399,487 | A | 8/1983 | Neumann | 361/391 |
| 4,479,198 | A | 10/1984 | Romano et al. | 364/900 |
| 4,480,835 | A | 11/1984 | Williams | 273/148 B |
| 4,516,777 | A | 5/1985 | Nikora | 273/148 B |
| 4,543,450 | A | 9/1985 | Brandt | 179/2 C |

(Continued)

FOREIGN PATENT DOCUMENTS

| | | |
|---|---|---|
| CA | 2011442 | 9/1990 |
| CA | 2020357 | 12/1990 |
| EP | 0 251 477 A2 | 1/1988 |
| EP | 0 351 961 A2 | 1/1990 |
| EP | 0 382 016 A2 | 8/1990 |

(Continued)

OTHER PUBLICATIONS

JP Notice of Reason for Rejection; Application No. 2007-141164, Oct. 2, 2007.
JP Judgment; Application No. 2002-71347; Title: System Having Implemented an Input-Output Interface Device, Mar. 28, 2006.
JP Decision of Rejection; Application No. 2007-141164; Title: System Using an Input and Output Interface Device, Jan. 8, 2008.
JP Decision of Rejection; Application No. 2007-141165; Title: Data Transmitting/Receiving Apparatus, Jan. 8, 2008.

(Continued)

*Primary Examiner*—My-Trang Ton

(57) ABSTRACT

A card type input/output interface device includes a first connection part for transferring data between a main body of an electronic device and the card type input/output interface device, a second connection part which is coupled to the first connection part and transfers data between an external device and the card type input/output interface device, and a card supporting the first and second connection part. The first connection part is accommodated in the main body when the card type input/output interface device is inserted into a slot provided in the main body.

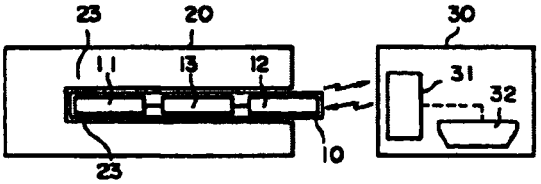

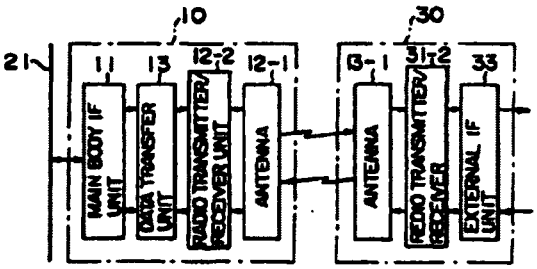

US00RE36769F1

(12) EX PARTE REEXAMINATION CERTIFICATE (7213th)

United States Patent
Ozawa et al.

(10) Number: US RE36,769 F1
(45) Certificate Issued: Dec. 8, 2009

(54) CARD TYPE INPUT/OUTPUT INTERFACE DEVICE AND ELECTRONIC DEVICE USING THE SAME

(75) Inventors: Masayuki Ozawa, Sagamihara (JP); Shigeru Suzuki, Kawasaki (JP)

(73) Assignee: Fujitsu Limited, Nakaharu-Ku, Kawasaki-Shi, Kanagawa (JP)

Reexamination Request:
No. 90/007,546, May 18, 2005
No. 90/008,071, Jun. 28, 2006

Reexamination Certificate for:

| | |
|---|---|
| Patent No.: | **Re. 36,769** |
| Issued: | **Jul. 11, 2000** |
| Appl. No.: | **08/731,754** |
| Filed: | **Oct. 18, 1996** |

Related U.S. Patent Documents

Reissue of:

| | |
|---|---|
| (64) Patent No.: | **5,357,091** |
| Issued: | **Oct. 18, 1994** |
| Appl. No.: | **07/875,800** |
| Filed: | **Apr. 30, 1992** |

(30) Foreign Application Priority Data

Apr. 30, 1991 (JP) ..... 3-124635

(51) Int. Cl.
*G06K 19/06* (2006.01)

(52) U.S. Cl. ..... 235/380; 235/492; 235/486

(58) Field of Classification Search ..... None
See application file for complete search history.

(56) References Cited

U.S. PATENT DOCUMENTS

| | | | | |
|---|---|---|---|---|
| 1,484,648 | A | 2/1924 | Jenkins | |
| 3,936,833 | A | 2/1976 | Bush | 343/225 |
| 4,250,563 | A | 2/1981 | Struger | 364/900 |
| 4,286,262 | A | 8/1981 | Wahl | 340/694 |
| 4,362,905 | A | 12/1982 | Ismail | 179/1 PC |
| 4,399,487 | A | 8/1983 | Neumann | 361/391 |
| 4,479,198 | A | 10/1984 | Romano et al. | 364/900 |
| 4,480,835 | A | 11/1984 | Williams | 273/148 B |
| 4,516,777 | A | 5/1985 | Nikora | 273/148 B |
| 4,543,450 | A | 9/1985 | Brandt | 179/2 C |

(Continued)

FOREIGN PATENT DOCUMENTS

| | | |
|---|---|---|
| CA | 2011442 | 9/1990 |
| CA | 2020357 | 12/1990 |
| EP | 0 251 477 A2 | 1/1988 |
| EP | 0 351 961 A2 | 1/1990 |
| EP | 0 382 016 A2 | 8/1990 |

(Continued)

OTHER PUBLICATIONS

JP Notice of Reason for Rejection; Application No. 2007–141164, Oct. 2, 2007.
JP Judgment; Application No. 2002–71347; Title: System Having Implemented an Input–Output Interface Device, Mar. 28, 2006.
JP Decision of Rejection; Application No. 2007–141164; Title: System Using an Input and Output Interface Device, Jan. 8, 2008.
JP Decision of Rejection; Application No. 2007–141165; Title: Data Transmitting/Receiving Apparatus, Jan. 8, 2008.

(Continued)

*Primary Examiner*—My-Trang Ton

(57) ABSTRACT

A card type input/output interface device includes a first connection part for transferring data between a main body of an electronic device and the card type input/output interface device, a second connection part which is coupled to the first connection part and transfers data between an external device and the card type input/output interface device, and a card supporting the first and second connection part. The first connection part is accommodated in the main body when the card type input/output interface device is inserted into a slot provided in the main body.

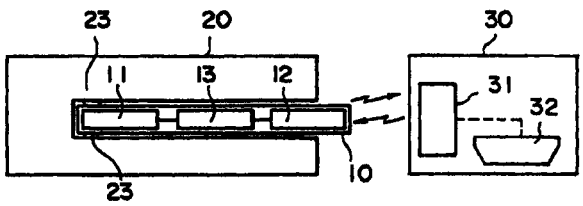

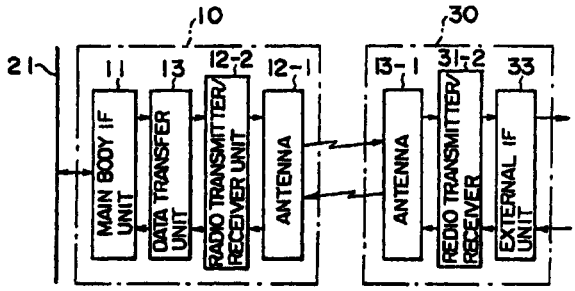

U.S. PATENT DOCUMENTS

| | | | | |
|---|---|---|---|---|
| 4,603,320 | A | 7/1986 | Farago | 340/347 DD |
| 4,686,506 | A | 8/1987 | Farago | 340/347 DD |
| 4,744,006 | A | 5/1988 | Duffield | 361/413 |
| 4,796,215 | A | 1/1989 | Hatta | 364/706 |
| 4,821,107 | A | 4/1989 | Naito et al. | 358/256 |
| 4,821,146 | A | 4/1989 | Behrens et al. | 361/383 |
| 4,845,751 | A | 7/1989 | Schwab | 381/25 |
| 4,850,899 | A | 7/1989 | Maynard | 439/628 |
| 4,855,779 | A | 8/1989 | Ishikawa et al. | 354/412 |
| 4,858,162 | A | 8/1989 | Kieffer et al. | 364/708 |
| 4,865,561 | A | 9/1989 | Collier et al. | 439/391 |
| 4,878,848 | A | 11/1989 | Ingalsbe | 439/76 |
| 4,882,702 | A | 11/1989 | Struger et al. | 364/900 |
| 4,894,792 | A | 1/1990 | Mitchell et al. | 364/708 |
| 4,922,420 | A | 5/1990 | Nakagawa et al. | 364/410 |
| 4,924,216 | A | 5/1990 | Leung | 340/709 |
| 4,924,534 | A | 5/1990 | Basile | 4/447 |
| 4,959,026 | A | 9/1990 | Kreinberg | 439/651 |
| 4,968,260 | A | 11/1990 | Ingalsbe | 439/76 |
| 4,972,457 | A | 11/1990 | O'Sullivan | |
| 4,972,470 | A | 11/1990 | Farago | 380/3 |
| 4,978,949 | A | 12/1990 | Herron et al. | 340/711 |
| 4,980,856 | A | 12/1990 | Ueno | 364/900 |
| 4,985,921 | A | 1/1991 | Schwartz | 380/24 |
| 4,991,201 | A | 2/1991 | Tseng | |
| 5,030,128 | A | 7/1991 | Herron et al. | 439/372 |
| 5,036,313 | A | 7/1991 | Lin et al. | 340/700 |
| 5,036,429 | A | 7/1991 | Kaneda et al. | 361/392 |
| 5,043,721 | A | 8/1991 | May | |
| 5,046,066 | A | 9/1991 | Messenger | 370/94.1 |
| 5,050,041 | A | 9/1991 | Shafi | 361/391 |
| 5,139,439 | A | 8/1992 | Shie | 439/359 |
| 5,142,446 | A | 8/1992 | Tanaka et al. | 361/393 |
| 5,149,945 | A | 9/1992 | Johnson et al. | 235/380 |
| 5,153,585 | A | 10/1992 | Negishi et al. | 340/870.28 |
| 5,155,663 | A | 10/1992 | Harase | 361/395 |
| 5,157,247 | A | 10/1992 | Takahira | 235/492 |
| 5,175,818 | A | 12/1992 | Kunimoto et al. | 395/200 |
| 5,183,450 | A | 2/1993 | Stelmach | 482/83 |
| 5,184,282 | A | 2/1993 | Kaneda et al. | 361/395 |
| 5,202,817 | A | 4/1993 | Koenck et al. | 361/393 |
| 5,212,369 | A | 5/1993 | Karlisch et al. | 235/380 |
| 5,212,373 | A | 5/1993 | Fujioka et al. | 235/492 |
| 5,224,216 | A | 6/1993 | Gordon et al. | |
| 5,227,953 | A | 7/1993 | Lindberg et al. | 361/393 |
| 5,239,165 | A | 8/1993 | Novak | 235/375 |
| 5,241,160 | A | 8/1993 | Bashan et al. | 235/380 |
| 5,249,270 | A | 9/1993 | Stewart et al. | 395/200 |
| 5,274,765 | A | 12/1993 | Le Gallo | 395/275 |
| 5,339,239 | A | 8/1994 | Manabe et al. | 364/401 |
| 5,347,110 | A | 9/1994 | Audebert et al. | 235/380 |
| 5,373,149 | A | 12/1994 | Rasmussen | 235/492 |
| 5,483,422 | A | 1/1996 | Bowen et al. | 361/802 |
| 5,500,517 | A | 3/1996 | Cagliostro | 235/486 |
| 5,563,400 | A | 10/1996 | Le Roux | 235/486 |
| 5,574,270 | A | 11/1996 | Steffen | 235/441 |
| 5,635,701 | A | 6/1997 | Gloton | 235/486 |

FOREIGN PATENT DOCUMENTS

| | | |
|---|---|---|
| EP | 0 387 011 A2 | 9/1990 |
| EP | 0 394 114 A1 | 10/1990 |
| EP | 0 426 414 A2 | 5/1991 |
| EP | 0 490 373 A1 | 6/1992 |
| EP | 0 718 776 A2 | 6/1996 |
| EP | 0 718 777 A3 | 6/1996 |
| JP | S61-212140 | 9/1986 |
| JP | A 61-212140 | 9/1986 |
| JP | A 62-029344 | 2/1987 |
| JP | A 62-232877 | 10/1987 |
| JP | 62-248054 | 10/1987 |
| JP | A 62-267814 | 11/1987 |
| JP | S62-286328 | 12/1987 |
| JP | S63-25797 | 2/1988 |
| JP | 63-72657 | 4/1988 |
| JP | A 63-103494 | 5/1988 |
| JP | 64-8492 | 1/1989 |
| JP | U 64-13683 | 1/1989 |
| JP | A 01-114133 | 2/1989 |
| JP | U 64-34277 | 3/1989 |
| JP | A01-152522 | 6/1989 |
| JP | A 01-295384 | 11/1989 |
| JP | H2-8251 | 1/1990 |
| JP | 2-8251 | 1/1990 |
| JP | A 02-52800 | 2/1990 |
| JP | A 02-071654 | 3/1990 |
| JP | A 02-093821 | 4/1990 |
| JP | 2-126233 | 5/1990 |
| JP | 02-130626 | 5/1990 |
| JP | A 02-223088 | 5/1990 |
| JP | A 1990-128881 | 5/1990 |
| JP | HEI 02-157925 | 6/1990 |
| JP | U 02-92519 | 7/1990 |
| JP | 02-206729 | 8/1990 |
| JP | A 02-217982 | 8/1990 |
| JP | A 02-503605 | 10/1990 |
| JP | U 02-63138 | 11/1990 |
| JP | U 02-63139 | 11/1990 |
| JP | U 02-141877 | 11/1990 |
| JP | U 02-145471 | 12/1990 |
| JP | A 03-001287 | 1/1991 |
| JP | H03-022724 | 1/1991 |
| JP | A 03-077435 | 4/1991 |
| JP | A 2006-40433 | 6/2006 |
| JP | 2006-208125 | 7/2006 |
| WO | WO 90/13871 | 11/1990 |
| WO | WO 90/13872 | 11/1990 |

OTHER PUBLICATIONS

JP Trial Deicsion; Application No. 2006–40433; Title: A System Utilizing an Input/Output Interface Device, May 15, 2007.

JP Rejecton Assessment; Application No. 2006–208125; Title: Input/Output Interface Device & External Equipment, Jul. 3, 2007.

JP Notice of Reason for Rejection; Application No. 2007–141165, Oct. 2, 2007.

JP Decision of Final Rejection; Application No. 2002–112004; Title: Card–type input–output interface device, Dec. 16, 2006.

Japanese Unexamined Patent Publication (JP–A), Publication No. 04 (1990)–72826, Patent Application No. 02 (1990)–131924 titled "*Portable Terminal Processor*", 16 pages, May 22, 1990.

Arlan 400 Wireless Local Area Network, System Description, Telesystems SLW, Inc. Canada (1988).

"Understanding How to Apply the Meta Format", Memory Card, p. 36–38, plus cover, May/Jun. 1991.

Hewlett–Packard Laser Jet series II Printer User's Manual, 292 pages, Jul. 1987.

IEEE Standard for A Versatile Backplane BUS: VMEbus, An American National Standard, ANSI/IEEEANSI/IEEE Std. 1014–1987, Copyright © 1988 by The Institute of Electrical and Electronics Engineers, Inc., ISBN 0–471–61601–X, pp. i–viii, 1–5, and 167–196, 1988.

Rowinsky, Walt, "*Investment Firm Chooses ShareSpool Card for Its Simplicity, Modular Cabling*", Connectivity Focus, p. C/32, Apr. 19, 1988.

"*LaserJet Add–in Board Provides Transparent Print Spooling for Four Users*", PC Magazine, p. 51, Jan. 17, 1989.
Van Kirk, Doug, "*Four Ways to Share, Switches, spools, buffers, and boxes from $79 to $795 that let you be charitable with your printer power*", PC/Computing, pp. 76–79, 83, May 1989.
Dryden, Patrick, "*Low–Speed Radio LAN Cards Bring wireless Netware Link*", Info World, Copyright 1989 Info World Media Group, 2 pages, Sep. 11, 1989.
"*Replace Cabling Headaches with Radio or Light*", What's New, Connectivity, BYTE, Mc–Graw Hill Publication, p. 58 plus cover, Oct. 1989.
"*Telesystems releases wireless local net for personal computers*", Products and Services, 1989 Network World, Copyright 1989 Network World, Inc., 1 page, Oct. 16, 1989.
DeJean, David, "*LANS on the Air, Wireless networks help cut through the Gordian knots of LAN cabling*", PC Computing, vol. 3, No. 1, p. 149–150 plus cover, Jan. 1990.
Hidehiro Saishu, "*Basic Knowledge for PC–LAN Configuration and Role of Network OS*", Computer & Network, vol. 8, No. 4, 3 pages, Apr. 1990.
Derfler, Jr., Frank J., "*The Next Wave: LANS Without Wires, The LAN Survival Guide*", PC Magazine, vol. 9, No. 10, pp. 295–296, 299, 303, 309–310, 312, 316, 318, plus cover, May 29, 1990.
"*IC Memory Card Guideline Ver. 4*", JEITA, pp. 4–5, 15, 17, 19, 21, 32, and 33, Jun. 1990.
"*As For Standard Specification for IC Memory Card Guideline, Ver. 4*", Electronic Industry Monthly Report, Japan Electronic Industry Development Association, vol. 32, No. 8, 11 pages, Aug. 10, 1990.
"*The Agilis System*", Cover Benchtest, Personal Computer World, pp. 128–132 plus cover, Sep. 1990.
Reddy, Shyamala, "*Portable LANS, The Missing Links, Wireless Networks Provide Ease and Portability*", LAN Magazine, vol. 5, No. 9, 5 pages plus cover, Sep. 1990.
"*NCR has a wireless local area network running at 2 Mbps; NCR Cor. 's WaveLAN*", Information Access Company, a Thomson Corporation Company, Copyright 1990, 1 page, Sep. 10, 1990.
"*Wireless LAN: NCR unveils high–speed "spread–spectrum frequency technology" device; NCR WaveLAN; product announcement*", Information Access Company, a Thomson Corporation Company, Copyright 1990, 1 page, Sep. 17, 1990.
Lewis, Peter H., "*NCR Introduces Its Version of a Network Without Wires*", The Executive Computer, The New York Times, 1 page, Sep. 23, 1990.
PC Card Standard, Release 1.0, Personal Computer Memory Card International Association (PCMCIA), pp. 1–102, Nov. 1990.
"*Standard Specifications of IC Memory Cards Are Roughly Finalized*", Nikkei Byte, No. 78, 23 pages, Nov. 1, 1990.
Baker, Stan, "*Prospects are bright for flash*", Update/Non–Volatile Memory; Electronic Engineering Times, 3 pages, Nov. 26, 1990.
Helliwell, John, "*NCR, Motorola Change the Look of Wireless PC Networking Market*", The National Newspaper of Corporate Computing, vol. 7, No. 50, 1 page plus cover, Dec. 17, 1990.
BYTE, various articles, front page and unknown page, Jan. 1991.
BYTE, various articles, front page and p. 74, Apr. 1991.
Parker, Sara, "*NCR's WaveLAN: Moves Data at 0.6 Mbps Without Cables*", First Looks, PC Magazine, vol. 10, No. 9, p. 46 plus cover, May 14, 1991.
Kramer, Matt, "*Wireless LANs Are Sluggish but Useful, Motorola's Altair and NCR's WaveLAN Are Best Employed as Temporary or Adjunct LANs*", PC Week Reviews, pp. 91, 93–34, Jun. 3, 1991.
Bowden, Eric J., "*Telesystems Arlan*", LAN Times, Product Comparison, pp. 99–100 and 102, Jul. 8, 1991.
Clegg, Peter, "*NCR Wavelan*" Product Comparison, LAN Times, 3 pages, Jul. 8, 1991.
BYTE, various articles, front page and p. 76, Aug. 1991.
PC Card Standard, Release 2.0, Personal Computer Memory Card International Association (PCMCIA), 10 pages, Sep. 1991.
PC World, "*Dealing a New Standard—Take Any Card, PCMCIA 2.0 to Create Multifunction, Swappable Cards*", front page and p. 72, Feb. 1992.
Decision to Dismiss the Amendment under Patent Law Section 53, Patent Application No. H03–124635, 2 pages, Jul. 22, 1997.
Notification of Reason(s) for Rejection, Patent Application No. H03–124635, 3 pages, Dec. 2, 1997.
Notification of Reason(s) for Rejection, Patent Application No. H03–124635, 4 pages, Jun. 9, 1998.
Notification of Reason(s) for Rejection, Patent Application No. H03–124635, 4 pages, Jul. 27, 1999.
Decision of Rejection, Patent Application No. H03–124635, 2 pages, Nov. 30, 1999.
Notification of Reason(s) for Rejection, Patent Application No. H03–124635, 36 pages, Mar. 30, 2001.
Notification of Reason(s) for Rejection, Japanese Patent Application No. H03–124635, 35 pages, Aug. 10, 2001.
Appeal/Trial Decision, Japanese Patent Application No. H03–124635, 24 pages, Mar. 4, 2002.
Notice of Reason for Refusal, Japanese Patent Application No. 2000–016638, 4 pages, Aug. 14, 2001.
Decision of Rejection, Japanese Patent Application No. 2000–016638, 4 pages, Jan. 15, 2002.
Notification of Reasons for Rejection, Japanese Patent Application No. 2000–016638, 2 pages, Dec. 16, 2003.
Trial Decision, Japanese Patent Application No. 2000–016638, 12 pages, Mar. 23, 2004.
Office Action, Japanese Patent Application No. 2002–071347, 5 pages, Aug. 31, 2004.
Final Office Action, Japanese Patent Application No. 2002–071347, 2 pages, Mar. 8, 2005.
Notice of Reasons for Rejection, Japanese Patent Application No. 2002–112003, 5 pages, Aug. 20, 2002.
Decision of Final Rejection, Japanese Patent Application No. 2002–112003, 3 pages, Feb. 25, 2003.
Notice of Reasons for Rejection, Japanese Patent Application No. 2002–112003, 4 pages, Dec. 16, 2003.
Decision of Appeal, Japanese Patent Application No. 2002–112003, 13 pages, Apr. 9, 2004.
Notice of Reasons for Rejection, Japanese Patent Application No. 2002–112004, 4 pages, Mar. 8, 2005.
"Memories in My Pocket," BYTE magazine, p. 251–258, vol. 16, No. 2, Feb. 1991.
"Understanding How to Apply the Meta Format", Memory Card, p. 36–38, May/Jun. 1991.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 2, 4–18, 20, 22–39, 41–43, 45, 47–49 and 52–54 is confirmed.

Claims 1, 3, 19 and 21 were previously cancelled.

Claims 40, 44, 46, 50, 51 and 55 are cancelled.

New claims 56–96 are added and determined to be patentable.

56. A card type input/output interface device for operatively connecting an electronic device to an external device, comprising:

a card having a thickness of 3.3 Millimeters (mm) or smaller, inserted into a slot provided in the electronic device, wherein the slot comprises an opening formed in a sidewall of a main body of the electronic device;

a first data interface unit, provided on one end of the card, for coupling to the electronic device to transfer input information to the electronic device and output information from the electronic device when the card is inserted into the slot;

a second data interface unit, provided on an opposing end of the card, for coupling to the external device to transfer the output information to the external device and the input information from the external device, wherein the second data interface unit comprises a radio transmitter/receiver for transferring the data between the external device and the card type input/output interface device through a radio communications channel; and a data transfer circuit, incorporated with the card, in response to the input information being received by the second data interface unit, for transferring the input information to the first data interface unit and, in response to the output information being received by the first data interface unit, for transferring the output information to the second data interface unit.

57. A card type input/output interface device for operatively connecting an electronic device to an external device, comprising:

a card, inserted into a slot provided in the electronic device, provided with a first end portion and a second end portion opposite to the first end portion, wherein the slot comprises an opening formed in a sidewall of a main body of the electronic device;

a data transfer circuit, incorporated with the card, for transferring information between the electronic device and the external device;

a first data connector, provided on the first end portion of the card, for electrically connecting the data transfer circuit to the electronic device when the card is inserted into the slot, wherein the first data connector electrically couples with a third data connector formed on an inner surface of the slot; and a second data connector, provided on the second end portion of the card, for coupling the data transfer circuit to the external device, wherein the second data connector comprises a radio transmitter/receiver for transferring the data between the external device and the card type input/output interface device through a radio communications channel.

58. A card type input/output interface device for operatively connecting an electronic device to an external device, comprising:

a card, inserted into a slot provided in the electronic device, provided with a first end portion and a second end portion opposite to the first end portion, wherein the slot comprises an opening formed in a sidewall of a main body of the electronic device;

a data transfer circuit, incorporated with the card, for transferring information between the electronic device and the external device;

a first data connector, provided on the first end portion of the card, for electrically connecting the data transfer circuit to the electronic device when the card is inserted into the slot, wherein the first data connector electrically couples with a third data connector formed on an inner surface of the slot; and a second data connector, provided on the second end portion of the card, for coupling the data transfer circuit to the external device, wherein the second data connector comprises a radio transmitter/receiver for transferring the data between the external device and the card type input/output interface device through a radio communications channel, wherein in the inserted state the slot at least partially covers the second end portion of the card.

59. A card type input/output interface device for operatively connecting an electronic device to an external device, comprising:

a card, inserted into a slot provided in the electronic device, provided with a first end portion and a second end portion opposite to the first end portion, wherein the card is open to the external environment;

a data transfer circuit, incorporated with the card, for transferring information between the electronic device and the external device;

a first data connector, provided on the first end portion of the card, for electrically connecting the data transfer circuit to the electronic device when the card is inserted into the slot; and a second data connector, provided on the second end portion of the card, for coupling the data transfer circuit to the external device, wherein the second data connector comprises a radio transmitter/receiver for transferring the data between the external device and the card type input/output interface device through a radio communications channel.

60. A card type input/output interface device for operatively connecting an electronic device to an external device, comprising:

a card, inserted into a slot provided in the electronic device, provided with a first end portion and a second end portion opposite to the first end portion;

a converter for receiving a parallel bit digital information from the electronic device and for converting the parallel bit digital information into a serial bit digital information;

a data transfer circuit, incorporated with the card, for transferring information between the electronic device and the external device;

a first data connector, provided on the first end portion of the card, for electrically connecting the data transfer circuit to the electronic device when the card is inserted into the slot, wherein the first data connector is formed on a surface of the first end portion of the card; and a second data connector, provided on the second end portion of the card, for coupling the data transfer circuit to the external device, wherein the second data connector comprises a radio transmitter/receiver for transferring the data between the external device and the card type input/output interface device through a radio communications channel.

61. A card type input/output interface device for operatively connecting an electronic device to an external device, comprising:

a card, inserted into a slot provided in the electronic device, wherein the slot comprises an opening formed in a sidewall of a main body of the electronic device;

a first data interface unit, provided on one end of the card, for coupling to the electronic device to transfer input information to the electronic device and output information from the electronic device when the card is inserted into the slot;

a second data interface unit, provided on an opposing end of the card, for coupling to the external device to transfer the output information to the external device and the input information from the external device, wherein the second data interface unit comprises a radio transmitter/receiver means for transferring the data between the external device and the card through a radio communications channel;

an antenna coupled to said radio transmitter/receiver means, wherein the antenna comprises a conductive pattern formed on the card; and a data transfer circuit, incorporated with the card, in response to the input information being received by the second data interface unit, for transferring the input information to the first data interface unit and, in response to the output information being received by the first data interface unit, for transferring the output information to the second data interface unit.

62. A system, to be operatively connected to an electronic device, comprising:

an external device providing a peripheral function for the electronic device, wherein the external device comprises an antenna and a wireless transmitter/receiver;

a card, electrically connected to the external device and inserted into a slot provided in the electronic device;

a first data interface unit for transmitting input information to the electronic device and for receiving output information from the electronic device when the card interface is inserted into the slot;

a second data interface unit for transmitting the output information to the external device and for receiving the input information from the external device, wherein the second data interface unit comprises a radio transmitter/receiver for transferring the data between the external device and the card through a radio communications channel; and a data transfer circuit, in response to receiving the input informaton by the second data interface unit, for transferring the input information to the first data interface unit and, in response to receiving the output information by the first data interface unit, for transferring the output information to the second data interface unit, wherein the first data interface unit, the second interface unit and the data transfer circuit are incorporated with card.

63. A card type input/output interface device as claimed in claim 38, wherein the card has a thickness of 3.3 Millimeters (mm) or smaller.

64. A system as claimed in claim 39, wherein the card has a thickness of 3.3 Millimeters (mm) or smaller.

65. A card type input/output interface device as claimed in claim 41, wherein the card has a thickness of 3.3 Millimeters (mm) or smaller.

66. A card type input/output interface device as claimed in claim 43, wherein the card has a thickness of 3.3 Millimeters (mm) or smaller.

67. A system as claimed in claim 45, wherein the card has a thickness of 3.3 Millimeters (mm) or smaller.

68. A system as claimed in claim 47, wherein the card has a thickness of 3.3 Millimeters (mm) or smaller.

69. A system as claimed in claim 49, wherein the card has a thickness of 3.3 Millimeters (mm) or smaller.

70. A system as claimed in claim 52, wherein the card has a thickness of 3.3 Millimeters (mm) or smaller.

71. A system as claimed in claim 54, wherein the card has a thickness of 3.3 Millimeters (mm) or smaller.

72. A card type input/output interface device as claimed in claim 57, wherein the card has a thickness of 3.3 Millimeters (mm) or smaller.

73. A card type input/output interface device as claimed in claim 58, wherein the card has a thickness of 3.3 Millimeters (mm) or smaller.

74. A card type input/output interface device as claimed in claim 59, wherein the card has a thickness of 3.3 Millimeters (mm) or smaller.

75. A card type input/output interface device as claimed in claim 60, wherein the card has a thickness of 3.3 Millimeters (mm) or smaller.

76. A card type input/output interface device as claimed in claim 61, wherein the card has a thickness of 3.3 Millimeters (mm) or smaller.

77. A card type input/output interface device as claimed in claim 62, wherein the card has a thickness of 3.3 Millimeters (mm) or smaller.

78. A card type input/output interface device as claimed in claim 38, wherein the slot comprises an opening formed in a sidewall of a main body of the electronic device.

79. A system as claimed in claim 39, wherein the slot comprises an opening formed in a sidewall of a main body of the electronic device.

80. A card type input/output interface device as claimed in claim 41, wherein the slot comprises an opening formed in a sidewall of a main body of the electronic device.

81. A card type input/output interface device as claimed in claim 42, wherein the slot comprises an opening formed in a sidewall of a main body of the electronic device.

82. A card type input/output interface device as claimed in claim 43, wherein the slot comprises an opening formed in a sidewall of a main body of the electronic device.

83. A system as claimed in claim 45, wherein the slot comprises an opening formed in a sidewall of a main body of the electronic device.

84. A system as claimed in claim 47, wherein the slot comprises an opening formed in a sidewall of a main body of the electronic device.

85. A system as claimed in claim 49, wherein the slot comprises an opening formed in a sidewall of a main body of the electronic device.

86. A system as claimed in claim 52, wherein the slot comprises an opening formed in a sidewall of a main body of the electronic device.

87. A system as claimed in claim 54, wherein the slot comprises an opening formed in a sidewall of a main body of the electronic device.

88. A card type input/output interface device as claimed in claim 59, wherein the slot comprises an opening formed in a sidewall of a main body of the electronic device.

89. A card type input/output interface device as claimed in claim 60, wherein the slot comprises an opening formed in a sidewall of a main body of the electronic device.

90. A card type input/output interface device as claimed in claim 62, wherein the slot comprises an opening formed in a sidewall of a main body of the electronic device.

91. A card type input/output interface device as claimed in claim 38, wherein the card is inserted within the slot.

92. A card type input/output interface device as claimed in claim 41, wherein the card is inserted within the slot.

93. A card type input/output interface device as claimed in claim 43, wherein the card is inserted within the slot.

94. A system as claimed in claim 45, wherein the card is inserted within the slot.

95. A system as claimed in claim 47, wherein the card is inserted within the slot.

96. A system as claimed in claim 49, wherein the card is inserted within the slot.

* * * * *

US00RE36769C2

(12) EX PARTE REEXAMINATION CERTIFICATE (9226th)

United States Patent
Ozawa et al.

(10) Number: US RE36,769 C2
(45) Certificate Issued: Aug. 21, 2012

(54) CARD TYPE INPUT/OUTPUT INTERFACE DEVICE AND ELECTRONIC DEVICE USING THE SAME

(75) Inventors: Masayuki Ozawa, Sagamihara (JP); Shigeru Suzuki, Kawasaki (JP)

(73) Assignee: Fujitsu Limited

Reexamination Request:
No. 90/011,529, Mar. 3, 2011

Reexamination Certificate for:

| | |
|---|---|
| Patent No.: | **Re. 36,769** |
| Issued: | **Jul. 11, 2000** |
| Appl. No.: | **08/731,754** |
| Filed: | **Oct. 18, 1996** |

Reexamination Certificate C1 1,036,769 issued Dec. 8, 2009

Certificate of Correction issued Jun. 29, 2010.

Related U.S. Patent Documents

Reissue of:

(64) Patent No.: 5,357,091
Issued: Oct. 18, 1994
Appl. No.: 07/875,800
Filed: Apr. 30, 1992

(30) Foreign Application Priority Data

Apr. 30, 1991 (JP) ..... 3-124635

(51) Int. Cl.
*G06K 19/06* (2006.01)

(52) U.S. Cl. ..... 235/380; 235/492; 235/486

(58) Field of Classification Search ..... 235/380
See application file for complete search history.

(56) References Cited

To view the complete listing of prior art documents cited during the proceeding for Reexamination Control Number 90/011,529, please refer to the USPTO's public Patent Application Information Retrieval (PAIR) system under the Display References tab.

*Primary Examiner*—Mark Sager

(57) ABSTRACT

A card type input/output interface device includes a first connection part for transferring data between a main body of an electronic device and the card type input/output interface device, a second connection part which is coupled to the first connecton part and transfers data between an external device and the card type input/output interface device, and a card supporting the first and second connection part. The first connection part is accommodated in the main body when the card type input/output interface device is inserted into a slot provided in the main body.

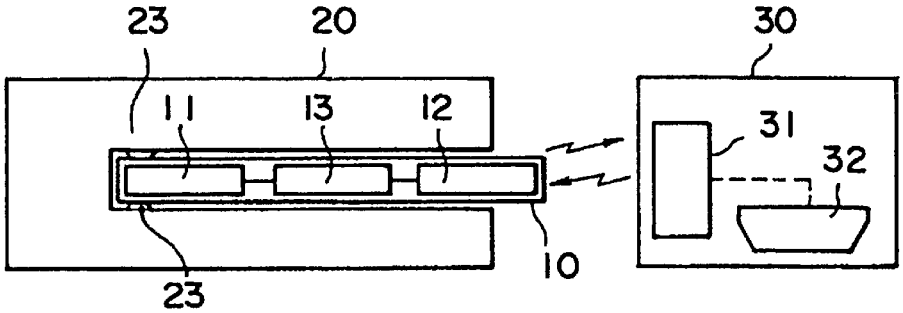

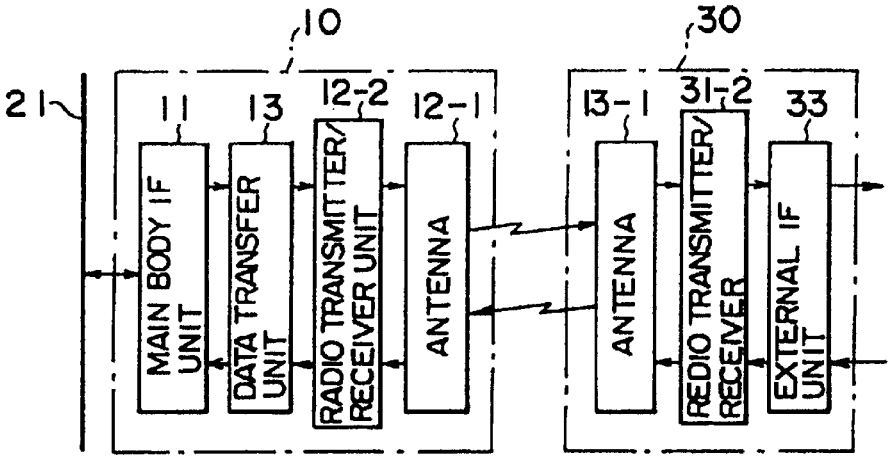

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 2, 4-17, 20, 22-35, 37, 41-42, 47-48, 52-53, 56-62, 65, 68, 70, 72-77, 80-81, 84, 86, 88-90, 92 and 95 is confirmed.

Claims 1, 3, 19, 21, 40, 44, 46, 50, 51 and 55 were previously cancelled.

Claims 18, 36, 38, 39, 43, 45, 49, 54, 63, 64, 66, 67, 69, 71, 78, 79, 82, 83, 85, 87, 91, 93, 94 and 96 are cancelled.

* * * * *